US010945149B1

(12) United States Patent
Ryu et al.

(10) Patent No.: US 10,945,149 B1
(45) Date of Patent: Mar. 9, 2021

(54) TIME DOMAIN BEHAVIOR AND QCL RELATION FOR SINR MEASUREMENT

(71) Applicant: QUALCOMM Incorporated, San Diego, CA (US)

(72) Inventors: Jung Ho Ryu, Fort Lee, NJ (US); Yan Zhou, San Diego, CA (US); Tianyang Bai, Bridgewater, NJ (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/802,730

(22) Filed: Feb. 27, 2020

Related U.S. Application Data

(60) Provisional application No. 62/903,557, filed on Sep. 20, 2019.

(51) Int. Cl.
*H04B 7/0417* (2017.01)
*H04W 24/10* (2009.01)
(Continued)

(52) U.S. Cl.
CPC .......... *H04W 24/10* (2013.01); *H04B 17/336* (2015.01); *H04L 5/0007* (2013.01);
(Continued)

(58) Field of Classification Search
CPC .... H04B 7/0617; H04B 7/0695; H04W 24/10
See application file for complete search history.

(56) References Cited

U.S. PATENT DOCUMENTS

2014/0241194 A1* 8/2014 Zhou ..................... H04L 5/0057
370/252
2019/0166513 A1 5/2019 Lin
(Continued)

FOREIGN PATENT DOCUMENTS

CN 109802794 A 5/2019
EP 3567900 A1 11/2019

OTHER PUBLICATIONS

International Search Report and Written Opinion—PCT/US2020/050648—ISAEPO—dated Nov. 25, 2020.
(Continued)

*Primary Examiner* — Mansour Oveissi
(74) *Attorney, Agent, or Firm* — Holland & Hart LLP

(57) ABSTRACT

Methods, systems, and devices for wireless communications are described. A user equipment (UE) may receive control signaling that configures a channel measurement resource and an interference measurement resource within a same time interval. The UE may transmit a measurement report that indicates a signal to interference plus noise ratio (SINR) measurement that is generated based on measuring the channel measurement resource and the interference measurement resource. In some cases, the UE may receive a quasi co-location (QCL) relationship indicator that indicates a QCL relationship for the interference measurement resource or the channel measurement resource. The UE may measure the channel measurement resource and the interference measurement resource in accordance with the QCL relationship.

26 Claims, 17 Drawing Sheets

(51) Int. Cl.
*H04L 5/00* (2006.01)
*H04W 72/04* (2009.01)
*H04W 72/12* (2009.01)
*H04B 17/336* (2015.01)

(52) U.S. Cl.
CPC ......... *H04L 5/0057* (2013.01); *H04W 72/042* (2013.01); *H04W 72/046* (2013.01); *H04W 72/1268* (2013.01); *H04W 72/1289* (2013.01)

(56) References Cited

U.S. PATENT DOCUMENTS

2019/0223161 A1* 7/2019 Muruganathan ........ H04L 5/005
2019/0356364 A1* 11/2019 Maamari ............. H04B 7/0417
2020/0145866 A1* 5/2020 Onggosanusi ....... H04B 7/0413

OTHER PUBLICATIONS

ZTE: "Enhancements on Multi-Beam Operation", 3GPP Draft, 3GPP TSG RAN WG1 Meeting #94bis, R1-1810221 Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, Sep. 29, 2018 (Sep. 29, 2018), 8 pages, XP051517637, Retrieved from the Internet: URL: http://www.3gpp.org/ftp/tsg%5Fran/WG1%5FRL1/TSGR1%5F94b/Docs/R1%2D1810221%2Ezip, [retrieved on Nov. 13, 2028], the whole document, paragraphs [8805], [0021] - [0033]; figure 5.

* cited by examiner

US 10,945,149 B1

TIME DOMAIN BEHAVIOR AND QCL RELATION FOR SINR MEASUREMENT

CROSS REFERENCE

The present Application for Patent claims the benefit of U.S. Provisional Patent Application No. 62/903,557 by RYU et al., entitled "TIME DOMAIN BEHAVIOR AND QCL RELATION FOR SINR MEASUREMENT," filed Sep. 20, 2019, assigned to the assignee hereof, and expressly incorporated by reference herein.

BACKGROUND

The following relates generally to wireless communications, and more specifically to time domain behavior and quasi co-location (QCL) relation for signal to interference plus noise ratio (SINR) measurement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may transmit reference signals to a user equipment (UE) that may use the reference signals to perform channel estimation. Additionally, the base station and the UE may use beamforming to increase transmission directivity in a particular direction, which may increase communication reliability in that direction. Conventional techniques of performing channel estimation and beamforming may be deficient in at least some applications.

SUMMARY

The described techniques relate to improved methods, systems, devices, and apparatuses that support time domain behavior and quasi co-location (QCL) relation for signal to interference plus noise ratio (SINR) measurement. Generally, the described techniques provide for a user equipment (UE) to receive control signaling that configures a channel measurement resource (CMR) and an interference measurement resource (IMR) within a same time interval. The UE may transmit a measurement report that indicates a SINR measurement that is generated based on measuring the CMR and the IMR. A base station may receive the measurement report and may schedule communications to the UE, select a beam pair for use in communication via a wireless channel, or both.

In some cases, the UE may use a same beam to measure each of the CMR and the IMR to generate the L1-SINR measurement. To ensure that the L1-SINR measurement may be made using a single beam, a base station may choose a CMR and IMR that have a same QCL relationship and may transmit a QCL relationship indicator to the UE that indicates a QCL relationship for the IMR or the CMR. The UE may receive the QCL relationship indicator and may measure the CMR and the IMR in accordance with the QCL relationship.

A method for wireless communications by a UE is described. The method may include receiving control signaling that configures a channel measurement resource and an interference measurement resource within a same time interval and transmitting a measurement report that indicates a SINR measurement that is generated based on measuring the channel measurement resource and the interference measurement resource.

An apparatus for wireless communications by a UE is described. The apparatus may include a processor, memory in electronic communication with the processor, and instructions stored in the memory. The instructions may be executable by the processor to cause the apparatus to receive control signaling that configures a channel measurement resource and an interference measurement resource within a same time interval and transmit a measurement report that indicates a SINR measurement that is generated based on measuring the channel measurement resource and the interference measurement resource.

Another apparatus for wireless communications by a UE is described. The apparatus may include means for receiving control signaling that configures a channel measurement resource and an interference measurement resource within a same time interval and means for transmitting a measurement report that indicates a SINK measurement that is generated based on measuring the channel measurement resource and the interference measurement resource.

A non-transitory computer-readable medium storing code for wireless communications by a UE is described. The code may include instructions executable by a processor to receive control signaling that configures a channel measurement resource and an interference measurement resource within a same time interval and transmit a measurement report that indicates a SINR measurement that is generated based on measuring the channel measurement resource and the interference measurement resource.

Some examples of the method, apparatuses, and non-transitory computer-readable medium described herein may further include operations, features, means, or instructions for receiving a quasi co-location relationship indicator that indicates a quasi co-location relationship for the channel measurement resource, where the channel measurement resource and the interference measurement resource may be each measured in accordance with the indicated quasi co-location relationship.

Some examples of the method, apparatuses, and non-transitory computer-readable medium described herein may further include operations, features, means, or instructions for measuring a non-zero-power channel state information reference signal within the interference measurement resource.

Some examples of the method, apparatuses, and non-transitory computer-readable medium described herein may further include operations, features, means, or instructions for measuring the channel measurement resource and the interference measurement resource over a same beam.

Some examples of the method, apparatuses, and non-transitory computer-readable medium described herein may further include operations, features, means, or instructions for receiving a quasi co-location relationship indicator that indicates a quasi co-location relationship for the interference measurement resource, where the channel measurement resource and the interference measurement resource may be each measured in accordance with the indicated quasi co-location relationship.

Some examples of the method, apparatuses, and non-transitory computer-readable medium described herein may further include operations, features, means, or instructions for receiving a first quasi co-location relationship indicator that indicates a first quasi co-location relationship for the channel measurement resource, and receiving a second quasi co-location relationship indicator that indicates a second quasi co-location relationship for the interference measurement resource, where the channel measurement resource and the interference measurement resource may be each measured in accordance with the first quasi co-location relationship.

Some examples of the method, apparatuses, and non-transitory computer-readable medium described herein may further include operations, features, means, or instructions for receiving a scheduling grant based on the measurement report, and communicating a data transmission, a control transmission, or both, with a base station in accordance with the scheduling grant.

Some examples of the method, apparatuses, and non-transitory computer-readable medium described herein may further include operations, features, means, or instructions for receiving a beam command that indicates a first beam of a set of different beams, where communicating the data transmission, the control transmission, or both, with the base station uses the first beam.

In some examples of the method, apparatuses, and non-transitory computer-readable medium described herein, receiving the control signaling may include operations, features, means, or instructions for receiving the control signaling that indicates a first periodicity of the channel measurement resource and a second periodicity of the interference measurement resource, where each instance of the channel measurement resource occurs within a respective time interval that includes a respective instance of the interference measurement resource based on the first periodicity and the second periodicity.

Some examples of the method, apparatuses, and non-transitory computer-readable medium described herein may further include operations, features, means, or instructions for receiving an aperiodic measurement report trigger indicating a first instance of the channel measurement resource and a first instance of the interference measurement resource, where the SINR measurement may be generated based on measuring the first instance of the channel measurement resource and the first instance of the interference measurement resource.

Some examples of the method, apparatuses, and non-transitory computer-readable medium described herein may further include operations, features, means, or instructions for periodically transmitting an updated measurement report that may be generated based on measuring each instance of the channel measurement resource and a corresponding instance of the interference measurement resource based on the first periodicity and the second periodicity.

In some examples of the method, apparatuses, and non-transitory computer-readable medium described herein, receiving the control signaling may include operations, features, means, or instructions for receiving the control signaling that indicates a first semi-persistent configuration for the channel measurement resource and a second semi-persistent configuration for the interference measurement resource, where each instance of the channel measurement resource occurs within a respective time interval that includes a respective instance of the interference measurement resource based on the first semi-persistent configuration and the second semi-persistent configuration.

Some examples of the method, apparatuses, and non-transitory computer-readable medium described herein may further include operations, features, means, or instructions for transmitting an updated measurement report that may be generated based on measuring each instance of the channel measurement resource and a corresponding instance of the interference measurement resource based on the first semi-persistent configuration and the second semi-persistent configuration.

Some examples of the method, apparatuses, and non-transitory computer-readable medium described herein may further include operations, features, means, or instructions for measuring a channel state information reference signal within the channel measurement resource.

Some examples of the method, apparatuses, and non-transitory computer-readable medium described herein may further include operations, features, means, or instructions for measuring a zero-power channel state information reference signal within the interference measurement resource.

In some examples of the method, apparatuses, and non-transitory computer-readable medium described herein, measuring the channel measurement resource and the interference measurement resource may include operations, features, means, or instructions for measuring the channel measurement resource and the interference measurement resource based on using a beam that may have a same quasi co-location relationship for each of the channel measurement resource and the interference measurement resource.

In some examples of the method, apparatuses, and non-transitory computer-readable medium described herein, the measurement report may be a layer 1 SINR (L1-SINR) report.

A method for wireless communications by a base station is described. The method may include transmitting control signaling to configure a UE with a channel measurement resource and an interference measurement resource within a same time interval and receiving, from the UE, a measurement report that indicates a SINR measurement that is generated based on a measurement of the channel measurement resource and the interference measurement resource.

An apparatus for wireless communications by a base station is described. The apparatus may include a processor, memory in electronic communication with the processor, and instructions stored in the memory. The instructions may be executable by the processor to cause the apparatus to transmit control signaling to configure a UE with a channel measurement resource and an interference measurement resource within a same time interval and receive, from the UE, a measurement report that indicates a SINR measurement that is generated based on a measurement of the channel measurement resource and the interference measurement resource.

Another apparatus for wireless communications by a base station is described. The apparatus may include means for transmitting control signaling to configure a UE with a channel measurement resource and an interference measurement resource within a same time interval and means for receiving, from the UE, a measurement report that indicates a SINR measurement that is generated based on a measurement of the channel measurement resource and the interference measurement resource.

A non-transitory computer-readable medium storing code for wireless communications by a base station is described. The code may include instructions executable by a processor to transmit control signaling to configure a UE with a channel measurement resource and an interference measurement resource within a same time interval and receive, from the UE, a measurement report that indicates a SINR measurement that is generated based on a measurement of the channel measurement resource and the interference measurement resource.

Some examples of the method, apparatuses, and non-transitory computer-readable medium described herein may further include operations, features, means, or instructions for transmitting a quasi co-location relationship indicator that indicates a quasi co-location relationship for the channel measurement resource.

Some examples of the method, apparatuses, and non-transitory computer-readable medium described herein may further include operations, features, means, or instructions for transmitting a non-zero-power channel state information reference signal within the interference measurement resource.

Some examples of the method, apparatuses, and non-transitory computer-readable medium described herein may further include operations, features, means, or instructions for transmitting a reference signal within the interference measurement resource using a beam that has a same quasi co-location relationship for each of the channel measurement resource and the interference measurement resource.

Some examples of the method, apparatuses, and non-transitory computer-readable medium described herein may further include operations, features, means, or instructions for transmitting a quasi co-location relationship indicator that indicates a quasi co-location relationship for the interference measurement resource.

Some examples of the method, apparatuses, and non-transitory computer-readable medium described herein may further include operations, features, means, or instructions for transmitting a first quasi co-location relationship indicator that indicates a first quasi co-location relationship for the channel measurement resource, and transmitting a second quasi co-location relationship indicator that indicates a second quasi co-location relationship for the interference measurement resource.

Some examples of the method, apparatuses, and non-transitory computer-readable medium described herein may further include operations, features, means, or instructions for transmitting a scheduling grant based on the measurement report, and communicating a data transmission, a control transmission, or both, with the UE in accordance with the scheduling grant.

Some examples of the method, apparatuses, and non-transitory computer-readable medium described herein may further include operations, features, means, or instructions for transmitting a beam command that indicates a first beam of a set of different beams, where communicating the data transmission, the control transmission, or both, with the UE uses the first beam.

In some examples of the method, apparatuses, and non-transitory computer-readable medium described herein, transmitting the control signaling may include operations, features, means, or instructions for transmitting the control signaling that indicates a first periodicity of the channel measurement resource and a second periodicity of the interference measurement resource, where each instance of the channel measurement resource occurs within a respective time interval that includes a respective instance of the interference measurement resource based on the first periodicity and the second periodicity.

Some examples of the method, apparatuses, and non-transitory computer-readable medium described herein may further include operations, features, means, or instructions for transmitting an aperiodic measurement report trigger indicating a first instance of the channel measurement resource and a first instance of the interference measurement resource, where the SINR measurement may be generated based on measuring the first instance of the channel measurement resource and the first instance of the interference measurement resource.

Some examples of the method, apparatuses, and non-transitory computer-readable medium described herein may further include operations, features, means, or instructions for periodically receiving an updated measurement report that may be generated based on a measurement of each instance of the channel measurement resource and a corresponding instance of the interference measurement resource based on the first periodicity and the second periodicity.

In some examples of the method, apparatuses, and non-transitory computer-readable medium described herein, transmitting the control signaling may include operations, features, means, or instructions for transmitting the control signaling that indicates a first semi-persistent configuration for the channel measurement resource and a second semi-persistent configuration for the interference measurement resource, where each instance of the channel measurement resource occurs within a respective time interval that includes a respective instance of the interference measurement resource based on the first semi-persistent configuration and the second semi-persistent configuration.

Some examples of the method, apparatuses, and non-transitory computer-readable medium described herein may further include operations, features, means, or instructions for receiving an updated measurement report that may be generated based on a measurement of each instance of the channel measurement resource and a corresponding instance of the interference measurement resource based on the first semi-persistent configuration and the second semi-persistent configuration.

Some examples of the method, apparatuses, and non-transitory computer-readable medium described herein may further include operations, features, means, or instructions for transmitting a channel state information reference signal within the channel measurement resource.

Some examples of the method, apparatuses, and non-transitory computer-readable medium described herein may further include operations, features, means, or instructions for transmitting a zero-power channel state information reference signal within the interference measurement resource.

Some examples of the method, apparatuses, and non-transitory computer-readable medium described herein may further include operations, features, means, or instructions for transmitting a reference signal within the channel measurement resource using a beam that may have a same quasi co-location relationship for each of the channel measurement resource and the interference measurement resource.

In some examples of the method, apparatuses, and non-transitory computer-readable medium described herein, the measurement report may be a layer 1 SINR (L1-SINR) report.

DETAILED DESCRIPTION

A user equipment (UE) may determine a layer 1 signal to noise plus interference ratio (L1-SINR), which may involve the UE performing SINR measurements for transmissions from a base station over a short duration of time. The duration of time may be configured such that the interference term associated with the L1-SINR is not averaged over more than a threshold number of beams. Determining L1-SINR may involve the UE measuring a channel measurement resource (CMR) to determine a channel measurement and measuring an interference measurement resource (IMR) to determine an interference measurement. The time interval over which the CMR and IMR is being measured may be relatively short and may not be long enough for one or more interfering base stations to cycle through many downlink beams, and thus the interference measurement by the UE may not be an average of interference over transmission beams, receive beams, or both. To ensure that the UE measures CMRs and IMRs that are within a short enough duration of time, a base station may transmit to the UE a configuration for the CMR and IMR in which the CMR and IMR are within a same time interval. The SINR measurement may be over a short time interval so that the UE captures a current measurement of the channel. (e.g., an instantaneous observation of the wireless channel). The UE may generate and transmit a measurement report that indicates the SINR measurement, and the base station may use the indicated SINR for making communication determinations, such as scheduling communications to the UE and/or selecting a beam pair to use for communication via a wireless channel.

In some cases, the UE may use a same beam to measure each of the CMR and the IMR to generate the L1-SINR measurement. To ensure that the L1-SINR measurement may be made using a single beam, the base station may ensure that the CMR and IMR used for L1-SINR have a same QCL relationship that indicates to use a same beam for measuring each. The base station may do so by choosing CMRs and IMRs that already have the same QCL relationship or may override a configured QCL for the CMR or the IMR such that the CMR and IMR have the same QCL relationship. The UE may determine that the QCL relationship for the IMR is the same as that of the CMR.

Aspects of the disclosure are initially described in the context of a wireless communications system. Additional aspects of the disclosure are described in the context of an additional wireless communications system, a resource configuration, and a process flow. Aspects of the disclosure are further illustrated by and described with reference to apparatus diagrams, system diagrams, and flowcharts that relate to time domain behavior and QCL relation for SINR measurement.

Figure 1:
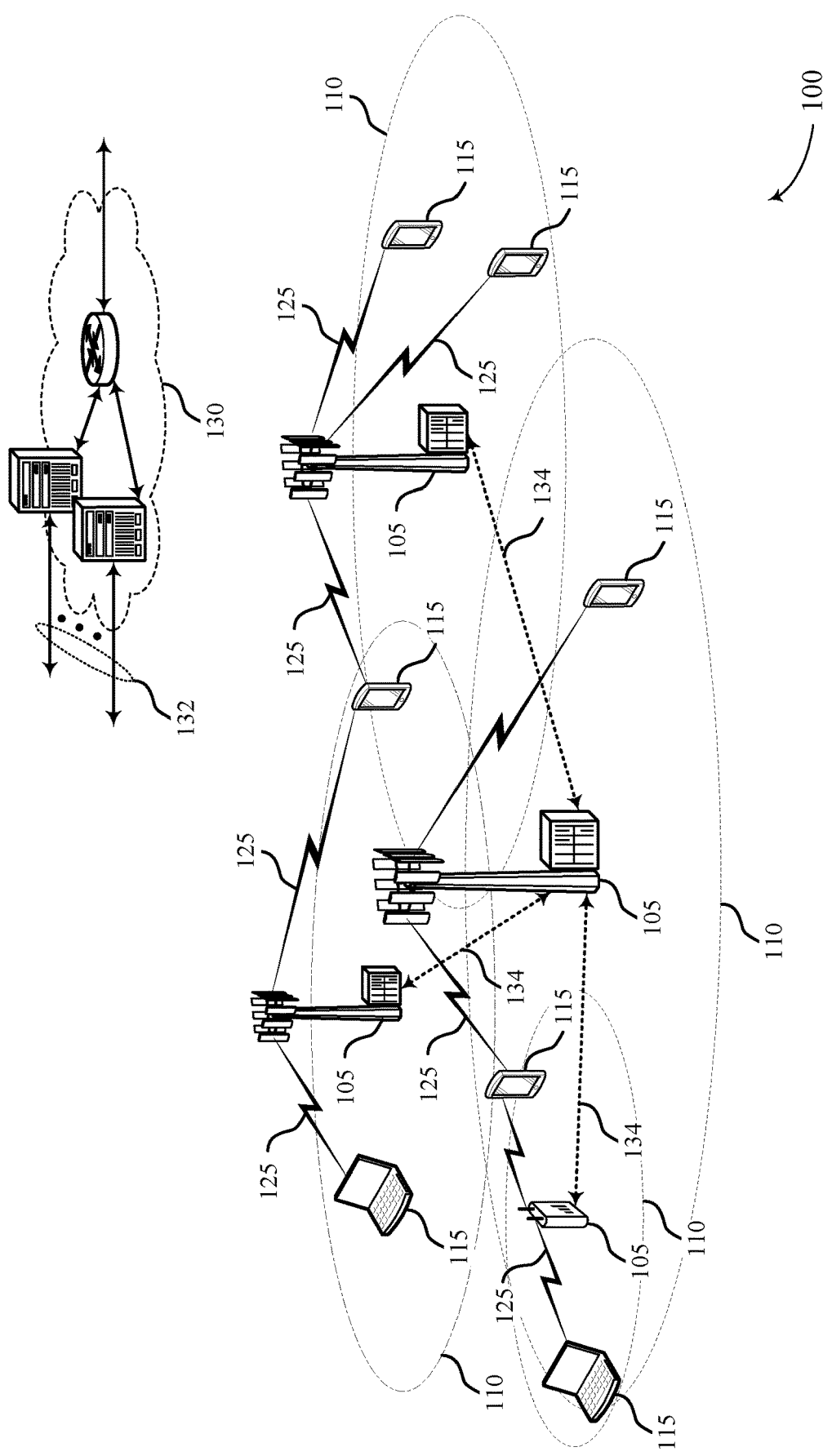
FIG. 1 illustrates an example of a wireless communications system that supports time domain behavior and quasi co-location (QCL) relation for signal to interference plus noise ratio (SINR) measurement in accordance with aspects of the present disclosure.

FIG. 1 illustrates an example of a wireless communications system 100 that supports time domain behavior and QCL relation for SINR measurement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station

105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the present disclosure may relate to time domain behavior and QCL relation for CMR and IMR for L1 SINR measurements. For instance, a UE 115 may receive control signaling that configures a CMR and an IMR within a same time interval. The UE 115 may transmit a measurement report that indicates a SINR measurement that is generated based on measuring the CMR and the IMR. In some cases, the UE 115 may receive a QCL relationship indicator that indicates a QCL relationship for the IMR or the CMR. The UE 115 may measure the CMR and the IMR in accordance with the QCL relationship.

Figure 2:
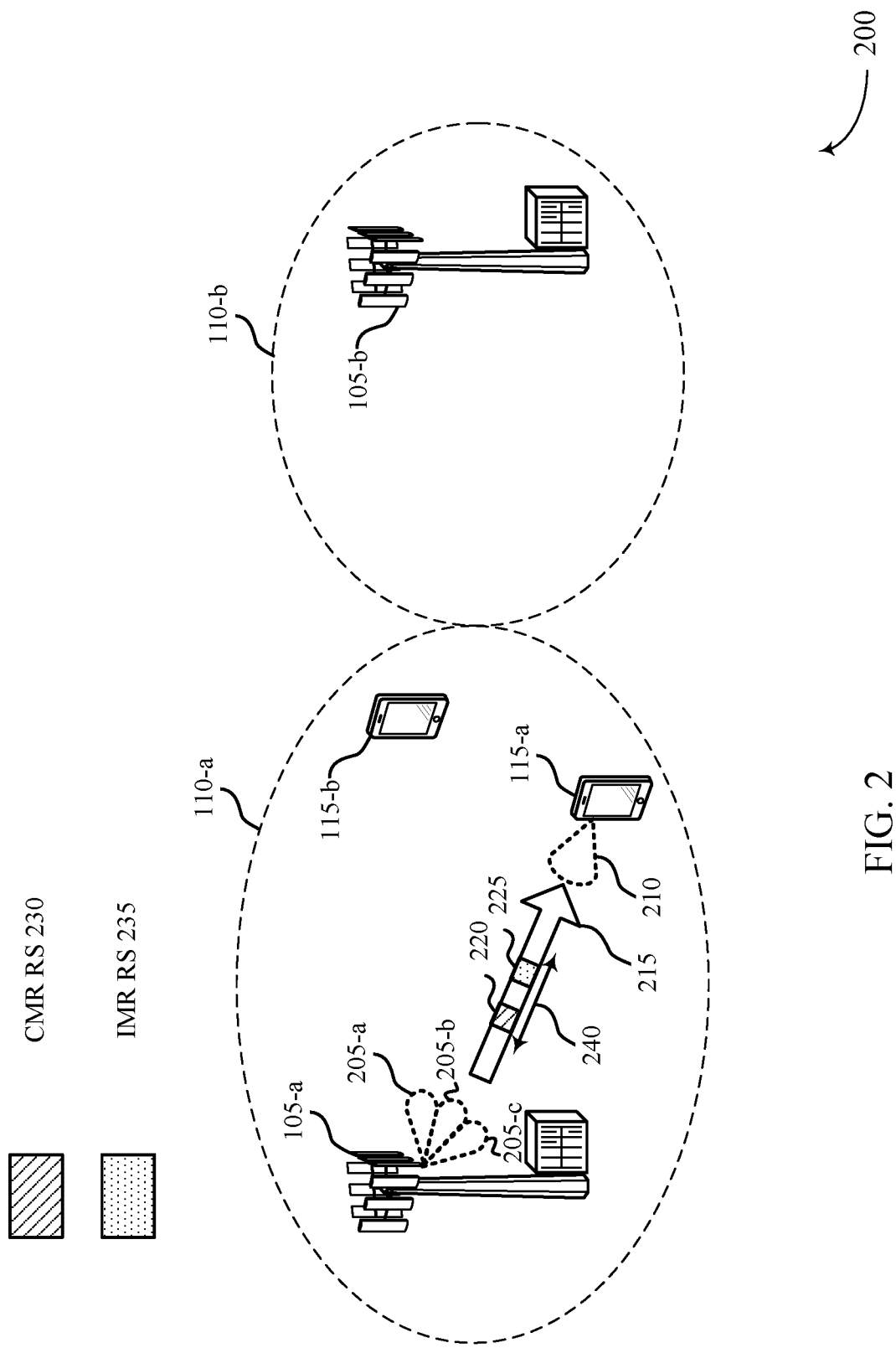
FIG. 2 illustrates an example of a wireless communications system that supports time domain behavior and QCL relation for SINR measurement in accordance with aspects of the present disclosure.

FIG. 2 illustrates an example of a wireless communications system 200 that supports time domain behavior and QCL relation for SINR measurement in accordance with aspects of the present disclosure. In some examples, wireless communications system 200 may implement aspects of wireless communications system 100. For instance, UE 115-a may be an example of a UE 115 as described with reference to FIG. 1 and base station 105-a may be an example of a base station 105 as described with reference to FIG. 1.

UEs 115-a and 115-b may be within a coverage area 110-a of base station 105-a. Base station 105-b, meanwhile, may be associated with a different coverage area 110 from base station 105-a (e.g., coverage area 110-b). Interference from base station 105-b with transmissions that occur within coverage area 110-a may be referred to as inter-cellular interference. Interference from base station 105-a to UE 115-b or vice-versa with transmissions between UE 115-a and base station 105-a may be referred to as intra-cellular interference. Base station 105-a may transmit signals to UEs 115 within coverage area 110-a via transmit beams 205 (e.g., transmit beams 205-a, 205-b, and 205-c). UE 115-a may receive signals from base station 105-a via receive beam 210 over communication link 215.

In an example, base station 105-a may transmit control signaling to UE 115-a (e.g., via beam 205-b) that configures one or more CMRs 220 and IMRs 225. UE 115-a may measure signals (e.g., reference signals 230 and 235) transmitted by base station 105-a over the configured CMRs 220 and IMRs 225 and may determine or calculate an L1-SINR. UE 115-a may transmit a report back to base station 105-a that indicates the determined or calculated L1-SINR.

An L1 SINR may be a SINR measurement over a short duration of time and may be used to approximate an instantaneous SINR measurement. The measurement may be short enough such that interfering base stations 105 (e.g., base station 105-b) may cycle through fewer than a threshold number of downlink beams. As such, the interference term may not be a function of (e.g., averaged over) a large number of transmit beams and receive beams (e.g., more than a threshold number of beams).

In some cases, determining L1-SINR may enable more effective MU-MIMO scheduling. For instance, if L1-SINR is determined using transmit beam 205-b and receive beam 210, L1-SINR may provide signal power and interfering power information for MU-MIMO when base station 105-a uses transmit beam 205-b and UE 115-a uses receive beam 210 to receive. The interference may be inter-cell interference from neighboring base stations 105 or gNBs (e.g., base station 105-b) or may be intra-cell interference from base station 105-a for another UE 115 (e.g., for UE 115-b).

The L1-SINR may be made of a channel measurement resource and an interference measurement resource and may be denoted as CMR+IMR, where CMR may be the channel measurement at a CMR 220 and IMR may be the interference measurement at an IMR 225. Measuring the CMR 220 may involve UE 115-a measuring a reference signal within the CMR 220 (e.g., a channel state information reference signal (CSI-RS)) transmitted by base station 105-a. Measuring the IMR 225, meanwhile, may involve UE 115-a measuring interference from a non-zero power (NZP) reference signal (e.g., CSI-RS) and/or a zero-power (ZP) reference signal (e.g., CSI-RS). If measuring interference from a NZP reference signal, base station 105-a may transmit a reference signal (e.g., the NZP CSI-RS) in at least one resource element (RE) of the IMR 225 and UE 115-a may measure the reference signal transmission from base station 105-a. Upon measuring the NZP reference signal transmission, UE 115-a may subtract the NZP reference signal transmission from the power measurement to determine interference. If measuring interference from a ZP reference signal, UE 115-a may measure power in the RE of the ZP CSI-RS to determine interference.

For an L1-SINR measurement to enhance MU-MIMO scheduling (e.g., for L1-SINR measurement to be useful), CMR 220 and IMR 225 may be near each other in terms of time. For example, the CMR 220 and the IMR 225 may occur within a same time interval. In some examples, the time interval may be a slot, subframe, frame, or the like. In some examples, the CMR 220 and the IMR 225 may occur within overlapping symbol periods (e.g., OFDM symbol periods) of a slot (e.g., partially or completely overlap in time), may occur within adjacent sets of symbol periods, or the like. In some examples, CMR 220 and IMR 225 may be periodic with similar or same periodicity. In some examples, using a current measurement of CMR 220 with outdated measurement of IMR 225 to generate the SINR may fail to capture the relative instantaneousness associated with determining L1-SINR and may thus be avoided. To avoid this, the UE 115-a generating the SINR may measure a CMR 220 and an IMR 225 that both occur within a same time interval.

In an example, each or all channel state information (CSI) resource settings linked to a CSI report setting having a same time domain behavior for an L1-SINR report. In some examples, the base station 105-a may transit control signaling to configure the UE 115-a with a first CSI resource setting for the CMR 220, and a second CSI resource setting for ZP or NZP-IMR. Having the same time domain behavior may involve an IMR 225 and a CMR 220 being within a same time interval or occurring within a number of symbol periods from each other. Having the same domain behavior may involve the IMR 225 and the CMR 220 overlapping in time (e.g., sharing time resources). In some examples, the IMR 225 and the CMR 220 may both occur within a same resource block, or may be in different, adjacent, resource blocks (RBs). In some examples, resources blocks that include CMR 220 may be interleaved with resource blocks that include IMR 225. In an example, CMR 220 may be in a first CSI resource setting while ZP or NZP-IMR 225 may be in a second CSI resource setting.

When base station 105-a transmits the control signaling to UE 115-a, the control signaling may indicate that UE 115-a is to transmit an aperiodic L1-SINR report, a semi-persistent L1-SINR report, or a periodic L1-SINR report. For an aperiodic L1-SINR report, common time domain behavior (e.g., that the CMR 220 and the IMR 225 occur in a same time interval) between the first and second CSI resource settings may be periodic, semi-persistent, or aperiodic. The time domain behavior being periodic or semi-persistent may involve UE 115-a having been configured by the base station 105-*a* with multiple instances of CMRs 220 and IMRs 225 that occur periodically or occur at defined time instances in accordance with a semi-persistent configuration. In some examples, the UE 115-*a* may measure the CMR 220 and IMR 25 indicated in the control signaling, such as an aperiodic measurement report trigger received from the base station 105-*a*, for generating an aperiodic L1-SINR report. The chosen periodic or semi-persistent instances may have the same time domain behavior (e.g., that the CMR 220 and the IMR 225 occur in a same time interval). For generating an aperiodic SINR report, the UE 115-*a* may receive an aperiodic measurement trigger indicating a particular instance of a CMR 220 and an IMR 225 that each occur in a same time interval, may measure the indicated CMR 220 and IMR 225, and may transmit an aperiodic measurement report that indicates the SINR determined by measuring the indicated CMR 220 and IMR 225.

For a periodic or semi-persistent L1-SINR report, common time domain behavior between the first and second CSI resources settings may be periodic or semi-persistent. For instance, UE 115-*a* may be configured by the base station 105-*a* with a periodicity and/or a semi-persistent allocation of multiple instances of CMRs 220 and IMRs 225 where each of the instances of the CMRs 220 and IMRs 225 occur within a same time interval. The UE 115-*a* may generate an L1-SINR report for some or each of those instances (e.g., for each CMR 220). More details about the configurations of CMR 220 and IMR 225 may be/described with reference to FIG. 3.

In some cases, UE 115-*a* may determine a QCL relationship between CMR 220 and IMR 225 to identify which receive beam to use for measuring the CMR 220 and IMR 225 for determining the L1-SINR. For instance, UE 115-*a* may determine that the same QCL exists between each CMR 220 and associated IMR(s) 225. If the base station 105-*a* has not transmitted control signaling to configure the UE 115-*a* with a QCL relationship for one or more associated IMR(s) 225 to be measured, the UE 115-*a* may determine that the QCL of the IMR 225 may be the same as that of the CMR 220 (e.g., the IMR 225 may follow QCL for the CMR 220). For example, the UE 115-*a* may receive control signaling that indicates a QCL relationship for the CMR 220, and the UE 115-*a* may use that same QCL relationship for the IMR 225. The UE 115-*a* may thus use a same receive beam (as indicated by the QCL relationship) for measuring each of the CMR 220 and the IMR 225.

In another example, if the associated IMR(s) 225 already has QCL configured, base station 105-*a* may ensure that the same QCL is configured for both CMR 220 and IMR 225. For example, the UE 115-*a* may receive control signaling from the base station 105-*a* that indicates a QCL relationship for the IMR 225. Because the base station 105-*a* has configured the QCL relationship for the IMR 225, a base station 105-*a* may use a transmit beam in accordance with the QCL relationship when transmitting a first reference signal in the CMR 220 and when transmitting a NZP or ZP reference signal in the IMR 225. The UE 115-*a* may thus use a same receive beam (as indicated by the QCL relationship for IMR 225) for measuring each of the CMR 220 and the IMR 225.

In an example, if the associated IMR(s) 225 has QCL configured but is different from QCL for CMR 220, the IMR(s) 225 may follow QCL for CMR 220. The base station 105-*a* may, in some examples, transmit control signaling that configures the CMR 220 with a QCL relationship that differs from a QCL relationship configured for the IMR 225. When the configured QCL relationships differ, the UE 115-*a* may use a beam indicated by the QCL relationship for the CMR 220 when measuring the IMR 225.

As such, the CMR 220 and associated IMRs 225 may have QCL configured to enable the UE 115-*a* to know which receive beam to use to measure each of the CMR 220 and the associated IMR 225, and the association may be determined by QCL matching.

Subsequent to receiving the measurement report, base station 105-*a* may attempt to schedule the UE 115-*a* and/or may select which beam pair to use for communication with the UE 115-*a*. In an example, the base station 105-*a* receive the measurement report and transmit a scheduling grant to UE 115-*a*. UE 115-*a* and base station 105-*a* may communicate according to the scheduling grant, where such communications may include transmitting and receiving a data transmission (e.g., physical uplink shared channel (PUSCH) or physical downlink shared channel (PDSCH)), transmitting and receiving a control transmission (e.g., physical uplink control channel (PUCCH) or physical downlink control channel (PDCCH)), or both.

In an example, when base station 105-*a* receives the measurement report, base station 105-*a* may determine to use the same beam as was used to measure CMR 220 and IMR 225 for generating the measurement report. In such cases, base station 105-*a* may transmit a beam command that indicates the same beam (e.g., indicates the same QCL relationship or no change to the previously indicated QCL relationship configured for measuring the CMR and/or IMR). In another example, base station 105-*a* may receive the measurement report and may determine that the indicated SINR is too low. In such cases, base station 105-*a* may instruct UE 115-*a* via a beam command to switch beams for subsequent data transmission and/or SINR measurement reporting (e.g., configure the UE 115-*a* with a new QCL relationship to indicate that the UE 115-*a* is to use a different beam).

Figure 3:
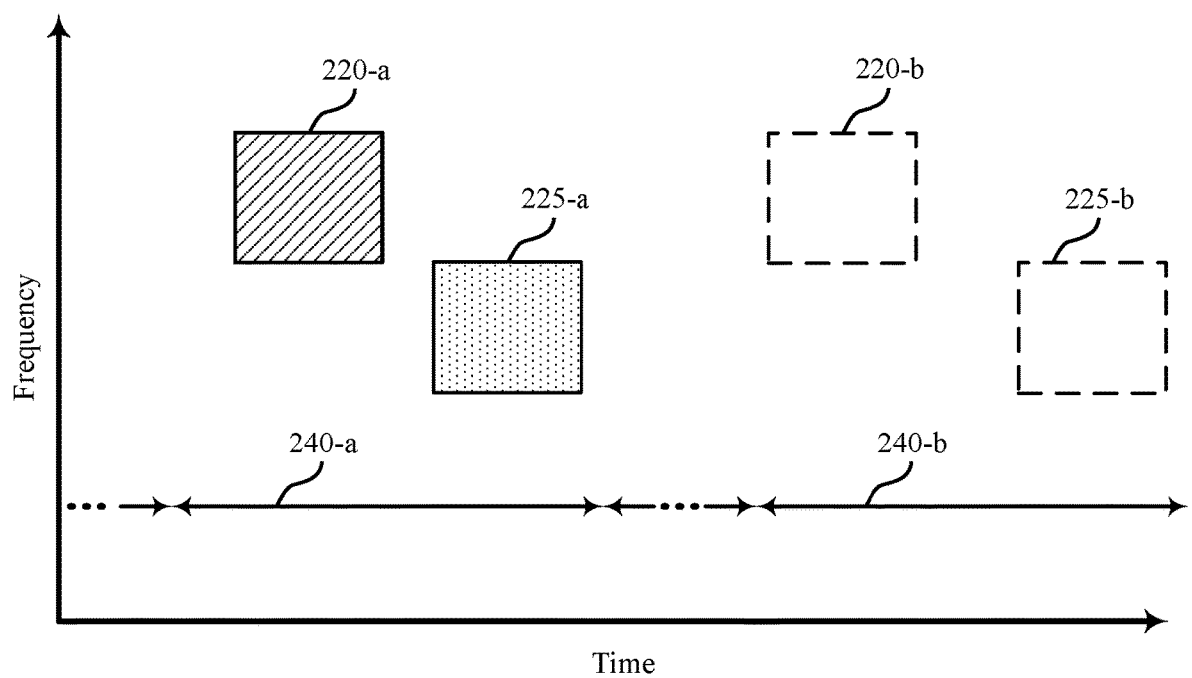
FIG. 3 illustrates an example of a resource configuration that supports time domain behavior and QCL relation for SINR measurement in accordance with aspects of the present disclosure.

FIG. 3 illustrates an example of a resource configuration 300 that supports time domain behavior and QCL relation for SINR measurement in accordance with aspects of the present disclosure. In some examples, resource configuration 300 may implement aspects of wireless communications system 200. For instance, CMRs 220-*a* and 220-*b* may be examples of CMRs 220 as described with reference to FIG. 2; IMRs 225-*a* and 225-*b* may be examples of IMRs 225 as described with reference to FIG. 2; and time intervals 240-*a* and 240-*b* may be examples of time intervals 240 as described with reference to FIG. 2.

Each CMR 220 and IMR 225 may have a same time domain behavior. For instance, both CMR 220-*a* and IMR 225-*a* may be in a single time interval 240-*a* (e.g., a slot) and both CMR 220-*b* and IMR 225-*b* may be in another single time interval 240-*b*. Additionally or alternatively, IMR 225-*a* may occur within a threshold number of slots from a start or end of CMR 220-*a*. In some cases, CMRs 220 and corresponding IMRs 225 may overlap in time and may be located in different RBs.

In some examples, a base station 105 may configure just CMR 220-*a* and IMR 225-*a* for aperiodic behavior and may configure CMRs 220-*a* and 220-*b* as well as IMRs 225-*a* and 225-*b* for periodic or semi-persistent behavior, as described in FIG. 2. If the UE 115 prepares and transmits an aperiodic L1-SINR report where periodic or semi-persistent behavior is configured, UE 115-*a* may measure reference signals 230 and 235 in CMR 220-*a* and IMR 225-*a*, respectively, or CMR 220-*b* and IMR 225-*b*, respectively, depending on what resources were indicated by the control signaling and may generate an aperiodic L1-SINR report accordingly. If the UE 115 prepares and transmits periodic or semi-persistent L1-SINR report, the UE 115 may measure reference signals 230 and 235 in CMR 220-*a* and IMR 225-*a*, respectively, and may generate and transmit a first corresponding L1-SINR report and may measure other reference signals 230 and 235 in CMR 220-*b* and IMR 225-*b*, respectively, and may generate and transmit a second corresponding L1-SINR report.

Figure 4:
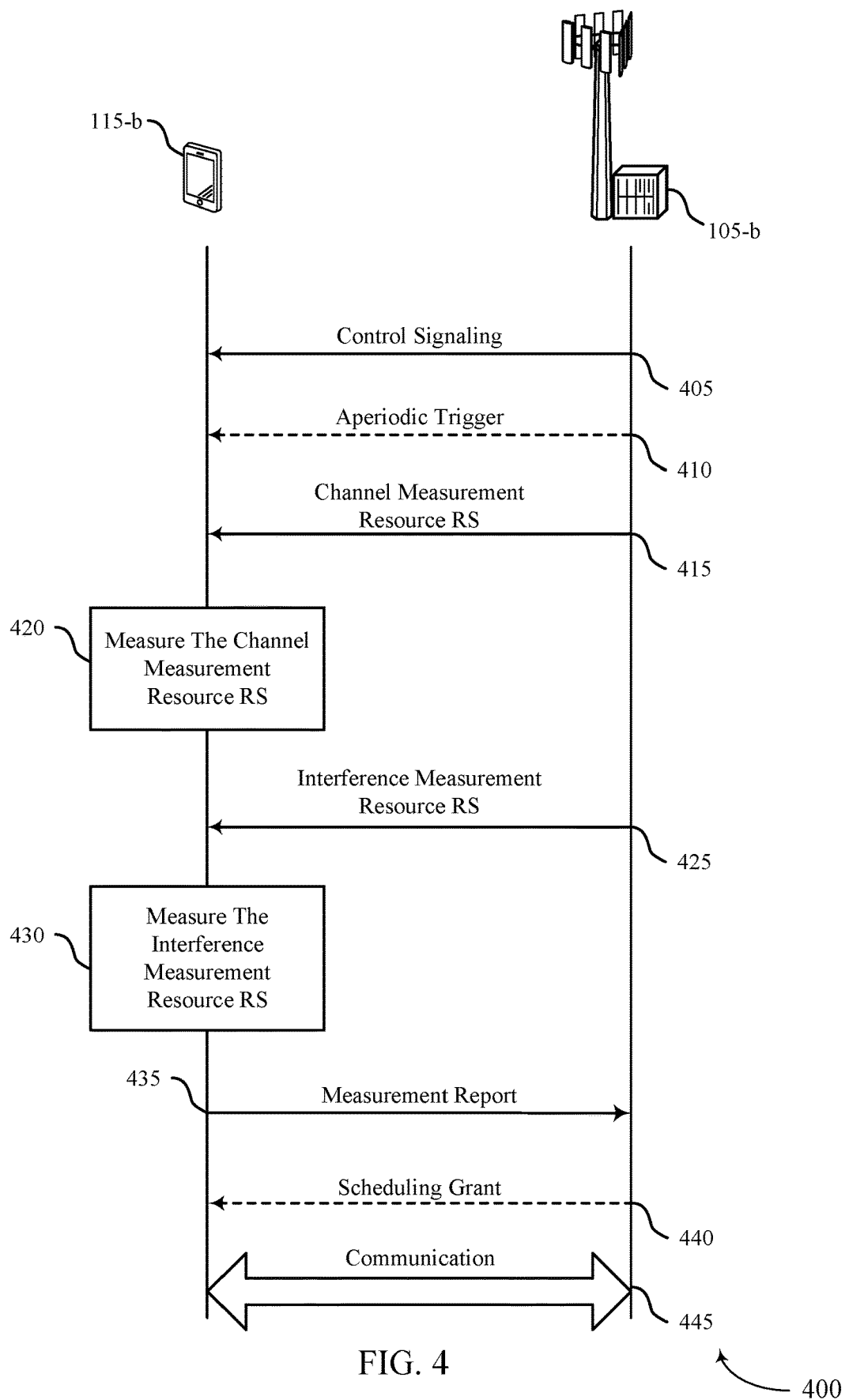
FIG. 4 illustrates an example of a process flow that supports time domain behavior and QCL relation for SINR measurement in accordance with aspects of the present disclosure.

FIG. 4 illustrates an example of a process flow 400 that supports time domain behavior and QCL relation for SINR measurement in accordance with aspects of the present disclosure. In some examples, process flow 400 may implement aspects of wireless communications system 100. For instance, process flow may include UE 115-*b*, which may be an example of a UE 115 as described with reference to FIG. 1, and base station 105-*b*, which may be an example of a base station 105 as described with reference to FIG. 1.

At 405, base station 105-*b* may transmit control signaling that configures a CMR and an IMR within a same time interval. In some cases, base station 105-*b* may transmit a QCL relationship indicator that indicates a QCL relationship for the IMR or the CMR. The QCL relationship indicator may be transmitted in the control signaling or may be transmitted by additional control signaling. In some cases, a QCL relationship indicator may be received for each of the measurement resources.

In some cases, the control signaling may indicate a first periodicity of the CMR and a second periodicity of the IMR, where each instance of the CMR occurs within a respective time interval that includes a respective instant of the IMR based on the first and second periodicities. In some cases, the control signaling may indicate a first semi-persistent configuration for the CMR and a second semi-persistent configuration for the IMR. In such cases, each instance of the CMR may occur within a respective time interval that includes a respective instance of the IMR based on the first semi-persistent configuration and the second semi-persistent configuration.

At 410, base station 105-*b* may transmit an aperiodic measurement report trigger to trigger UE 115-*b* into transmitting a measurement report. The aperiodic measurement report trigger may indicate a first instance of a CMR and a first instance of the IMR, where the SINR measurement is generated based on measuring the first instance of the CMR and the first instance of the IMR. In some cases, the aperiodic measurement report trigger may be transmitted with the control signaling.

At 415, base station 105-*b* may transmit a CMR reference signal over the CMR.

At 420, UE 115-*b* may measure the CMR reference signal over the CMR. In some cases, the CMR may be measured in accordance with the indicated QCL relationship. In some cases, the CMR reference signal may be a CSI-RS.

At 425, UE 115-*b* may receive the IMR reference signal over the IMR.

At 430, UE 115-*b* may measure the IMR reference signal over the IMR. In some cases, the IMR reference signal may be measured in accordance with the indicated QCL relationship. In some cases, the IMR reference signal may be a ZP-CSI-RS or a NZP-CSI-RS. In some cases, UE 115-*b* may measure the CMR and the IMR based on using a beam that has a same QCL relationship for each of the CMR and the IMR. In some cases, UE 115-*b* may measure the CMR and the IMR over a same beam.

At 435, UE 115-*b* may transmit a measurement report that indicates a SINR measurement (e.g., an L1-SINR measurement) that is generated based on measuring the CMR and the IMR. In some cases, UE 115-*b* may periodically transmit an updated measurement report that is generated based on measuring each instance of the CMR and a corresponding instance of the IMR based on the first and second periodicity indicated with the control signaling. If using the semi-persistent configurations, UE 115-*b* may transmit an updated measurement report that is generated based on measuring each instance of CMR and a corresponding instance of the IMR based on the first semi-persistent configuration and the second semi-persistent configuration.

At 440, base station 105-*b* may transmit a scheduling grant. The scheduling grant may be received based on receiving the measurement report.

At 445, UE 115-*b* and base station 105-*b* may communicate according to the grant. The communications may include a date transmission, a control transmission, or both. In some cases, base station 105-*b* may transmit a beam command that indicates a first beam of a set of different beams, where the first beam may be used to communicate the data transmission, the control transmission, or both.

Figure 5:
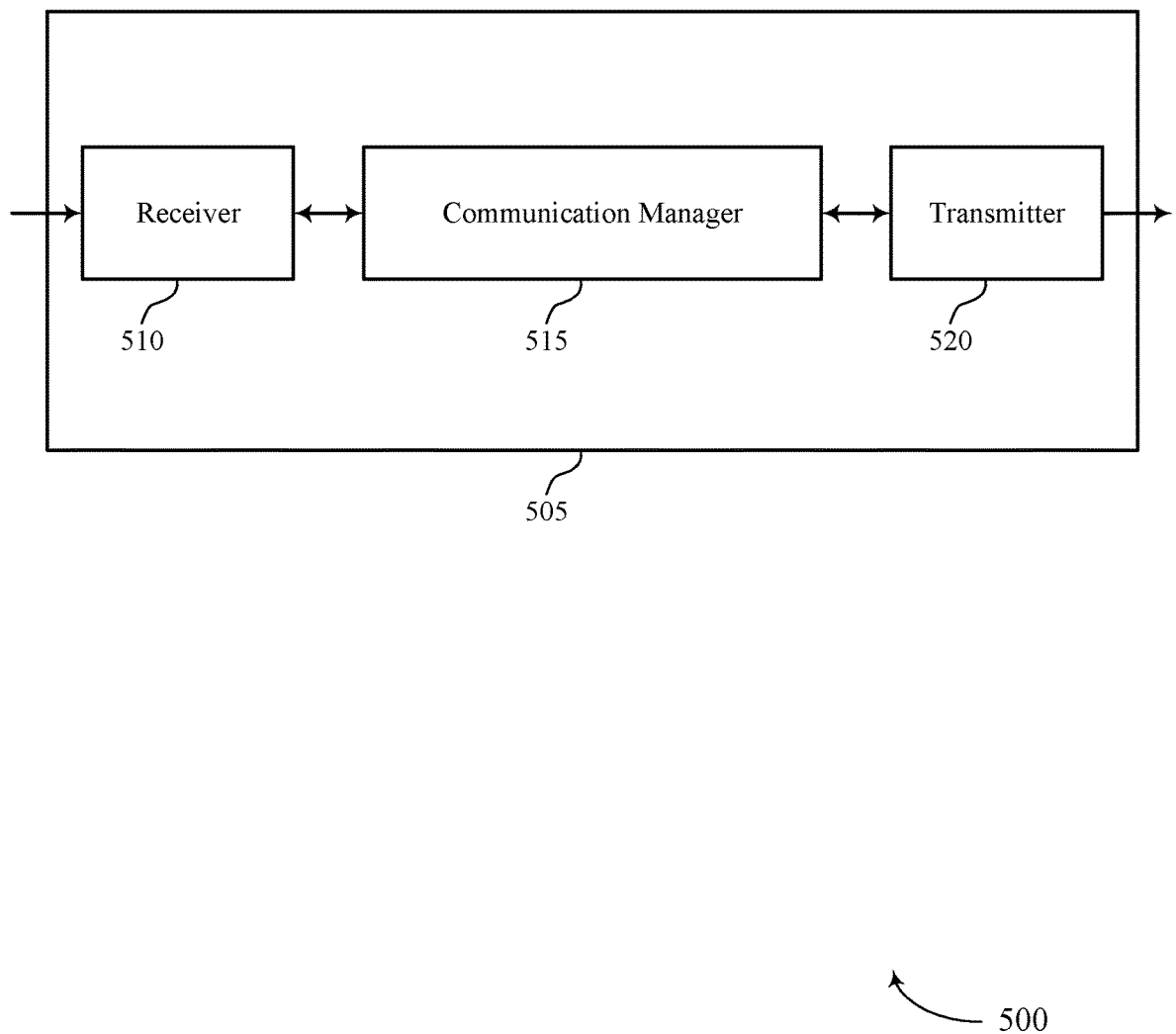
FIGS. 5 and 6 show block diagrams of devices that support time domain behavior and QCL relation for SINR measurement in accordance with aspects of the present disclosure.

FIG. 5 shows a block diagram 500 of a device 505 that supports time domain behavior and QCL relation for SINR measurement in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to time domain behavior and QCL relation for SINR measurement, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may receive control signaling that configures a CMR and an IMR within a same time interval and transmit a measurement report that indicates a signal to interference plus noise ratio (SINR) measurement that is generated based on measuring the CMR and the IMR. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
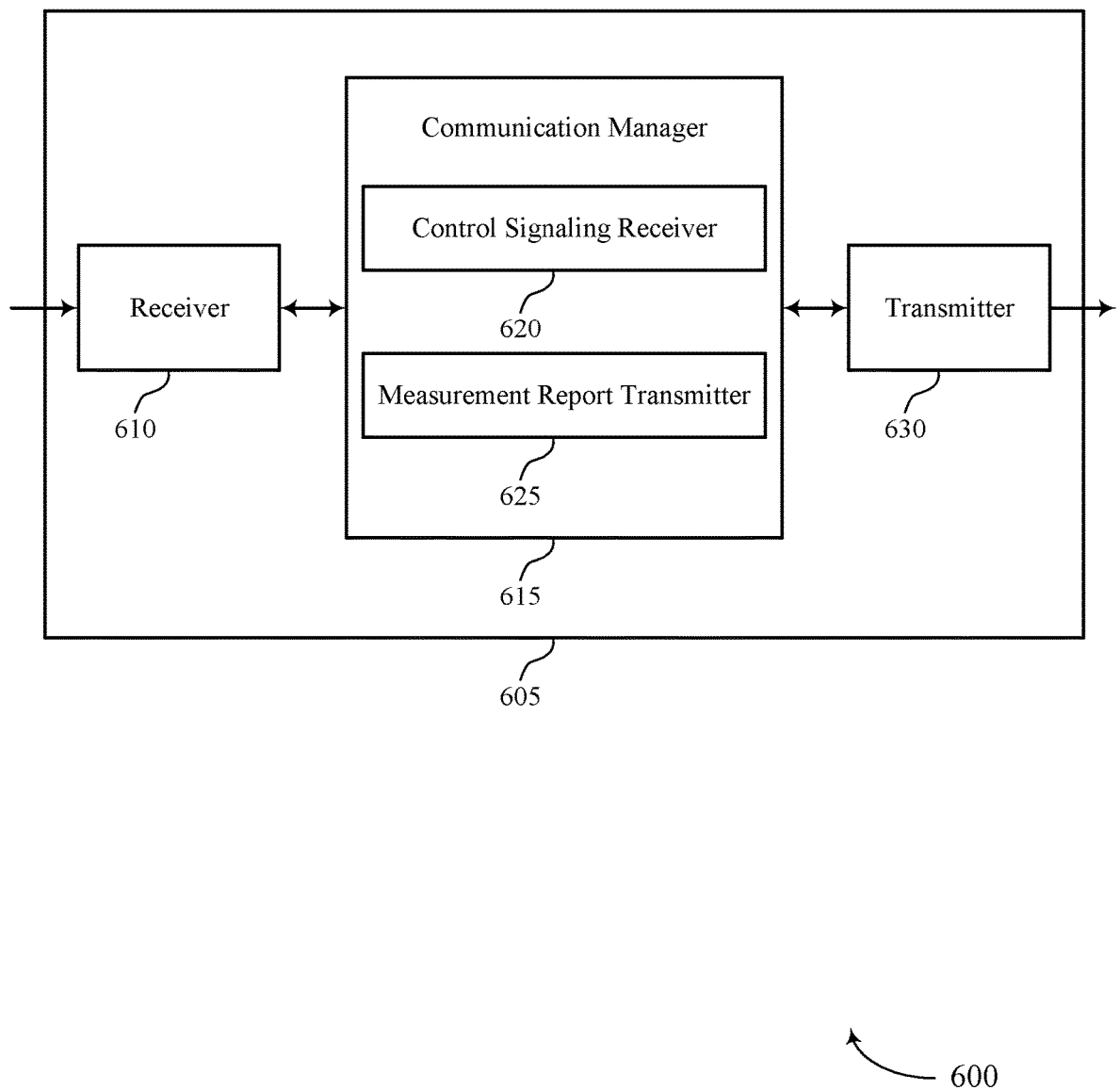

FIG. 6 shows a block diagram 600 of a device 605 that supports time domain behavior and QCL relation for SINR measurement in accordance with aspects of the present disclosure. The device 605 may be an example of aspects of a device 505, or a UE 115 as described herein. The device 605 may include a receiver 610, a communication manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to time domain behavior and QCL relation for SINR measurement, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a control signaling receiver 620 and a measurement report transmitter 625. The communication manager 615 may be an example of aspects of the communication manager 810 described herein.

The control signaling receiver 620 may receive control signaling that configures a CMR and an IMR within a same time interval.

The measurement report transmitter 625 may transmit a measurement report that indicates a SINR measurement that is generated based on measuring the CMR and the IMR.

The transmitter 630 may transmit signals generated by other components of the device 605. In some examples, the transmitter 630 may be collocated with a receiver 610 in a transceiver module. For example, the transmitter 630 may be an example of aspects of the transceiver 815 described with reference to FIG. 8. The transmitter 630 may utilize a single antenna or a set of antennas.

Figure 7:
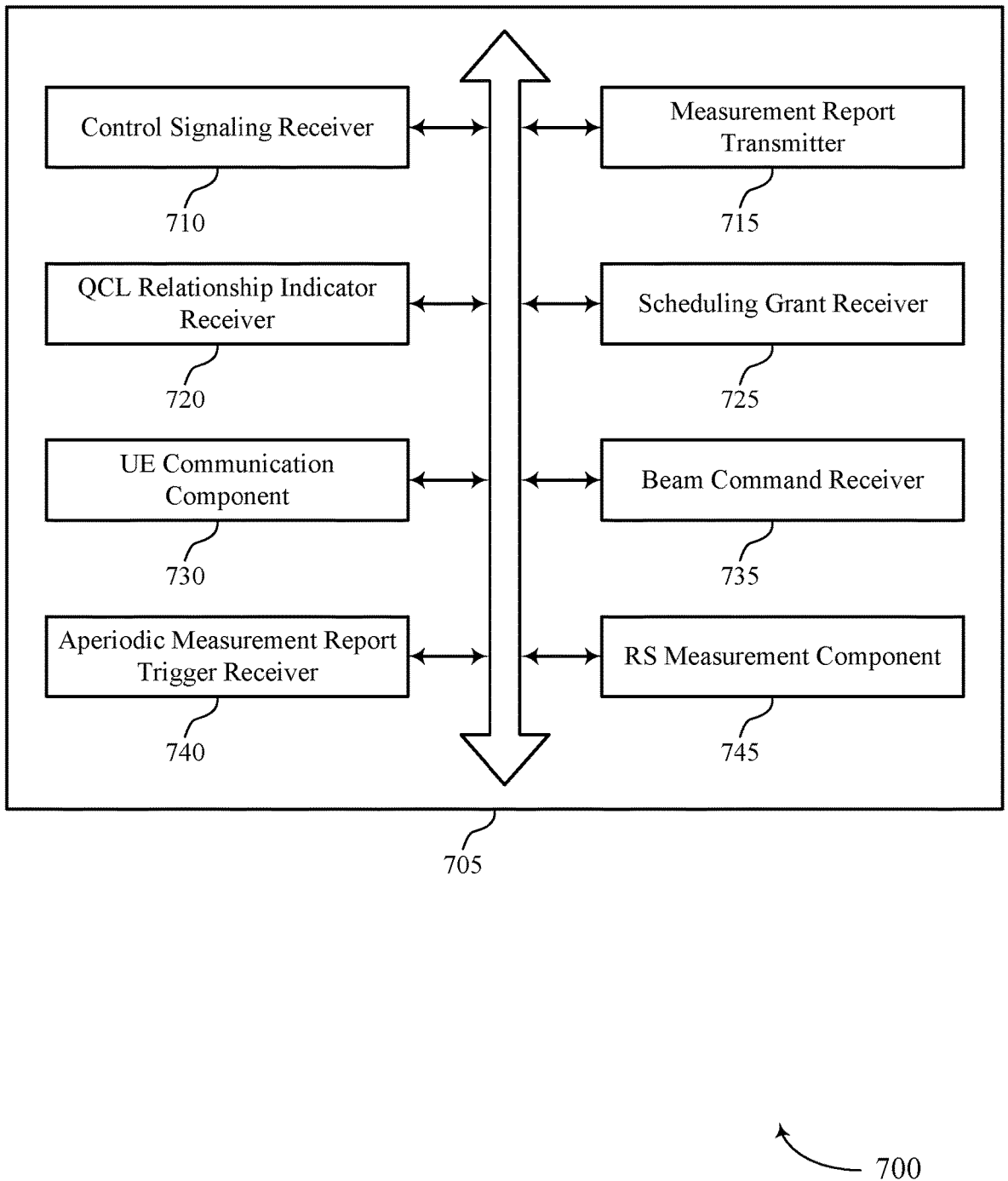
FIG. 7 shows a block diagram of a communication manager that supports time domain behavior and QCL relation for SINR measurement in accordance with aspects of the present disclosure.

FIG. 7 shows a block diagram 700 of a communication manager 705 that supports time domain behavior and QCL relation for SINR measurement in accordance with aspects of the present disclosure. The communication manager 705 may be an example of aspects of a communication manager 515, a communication manager 615, or a communication manager 810 described herein. The communication manager 705 may include a control signaling receiver 710, a measurement report transmitter 715, a QCL relationship indicator receiver 720, a scheduling grant receiver 725, an UE communication component 730, a beam command receiver 735, an aperiodic measurement report trigger receiver 740, and a reference signal (RS) measurement component 745. Each of these modules may communicate, directly or indirectly, with one another (e.g., via one or more buses).

The control signaling receiver 710 may receive control signaling that configures a CMR and an IMR within a same time interval. In some examples, the control signaling receiver 710 may receive the control signaling that indicates a first periodicity of the CMR and a second periodicity of the IMR, where each instance of the CMR occurs within a respective time interval that includes a respective instance of the IMR based on the first periodicity and the second periodicity. In some examples, the control signaling receiver 710 may receive the control signaling that indicates a first semi-persistent configuration for the CMR and a second semi-persistent configuration for the IMR, where each instance of the CMR occurs within a respective time interval that includes a respective instance of the IMR based on the first semi-persistent configuration and the second semi-persistent configuration.

The measurement report transmitter 715 may transmit a measurement report that indicates a SINR measurement that is generated based on measuring the CMR and the IMR. In some examples, the measurement report transmitter 715 may periodically transmit an updated measurement report that is generated based on measuring each instance of the CMR and a corresponding instance of the IMR based on the first periodicity and the second periodicity. In some examples, the measurement report transmitter 715 may transmit an updated measurement report that is generated based on measuring each instance of the CMR and a corresponding instance of the IMR based on the first semi-persistent configuration and the second semi-persistent configuration.

The QCL relationship indicator receiver 720 may receive a QCL relationship indicator that indicates a QCL relationship for the IMR, where the CMR and the IMR are each measured in accordance with the indicated QCL relationship. In some examples, the QCL relationship indicator receiver 720 may receive a QCL relationship indicator that indicates a QCL relationship for the CMR, where the CMR and the IMR are each measured in accordance with the indicated QCL relationship. In some examples, the QCL relationship indicator receiver 720 may receive a first QCL relationship indicator that indicates a first QCL relationship for the CMR. In some examples, the QCL relationship indicator receiver 720 may receive a second QCL relationship indicator that indicates a second QCL relationship for the IMR, where the CMR and the IMR are each measured in accordance with the first QCL relationship. In some cases, the channel measurement resource and the interference measurement resource may be measured over a same beam.

The scheduling grant receiver 725 may receive a scheduling grant based on the measurement report.

The UE communication component 730 may communicate a data transmission, a control transmission, or both, with a base station in accordance with the scheduling grant.

The beam command receiver 735 may receive a beam command that indicates a first beam of a set of different beams, where communicating the data transmission, the control transmission, or both, with the base station uses the first beam.

The aperiodic measurement report trigger receiver 740 may receive an aperiodic measurement report trigger indicating a first instance of the CMR and a first instance of the IMR, where the SINR measurement is generated based on measuring the first instance of the CMR and the first instance of the IMR.

The RS measurement component 745 may measure a channel state information reference signal within the CMR. In some examples, the RS measurement component 745 may measure a zero-power channel state information reference signal or a non-zero-power channel state information reference signal within the IMR. In some examples, the RS measurement component 745 may measure the CMR and the IMR based on using a beam that has a same QCL relationship for each of the CMR and the IMR.

Figure 8:
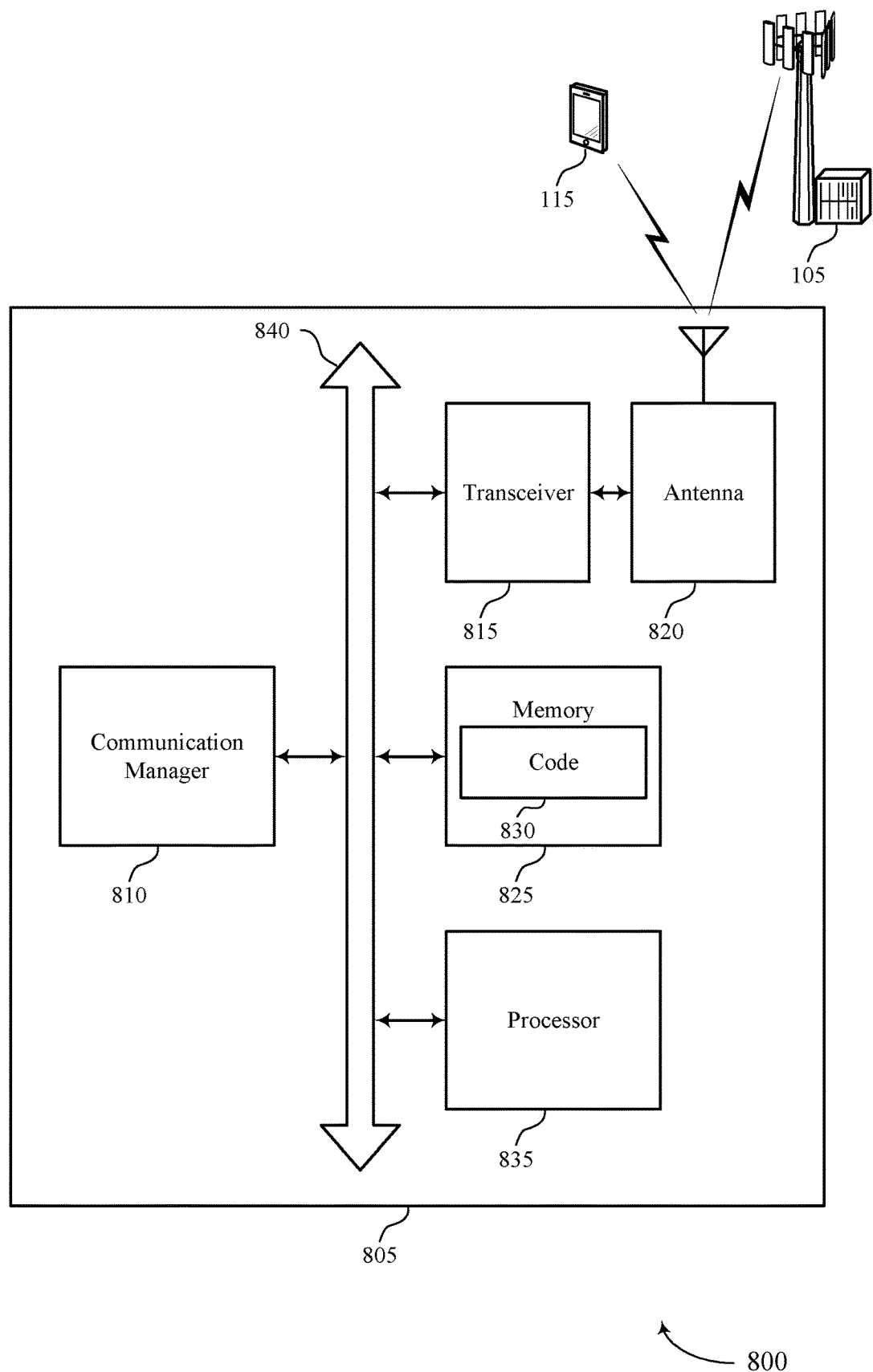
FIG. 8 shows a diagram of a system including a device that supports time domain behavior and QCL relation for SINR measurement in accordance with aspects of the present disclosure.

FIG. 8 shows a diagram of a system 800 including a device 805 that supports time domain behavior and QCL relation for SINR measurement in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may receive control signaling that configures a CMR and an IMR within a same time interval and transmit a measurement report that indicates a SINR measurement that is generated based on measuring the CMR and the IMR.

By measuring the CMR and IMR within a same time interval, device 805 may be capable, via communication manager 810, of determining L1-SINR to provide an estimate of instantaneous SINR that may capture inter-cell interference from neighboring base stations and/or intra-cell interference from a serving base station resulting due to communication with other UEs. As such when determining L1-SINR, device 805 may be capable of determining a SINR with a higher resolution of an instantaneous SINR as compared to devices that do not receive CMR and IMR within the same time interval, and may enhance scheduling and beam selection determinations.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting time domain behavior and QCL relation for SINR measurement).

Figure 9:
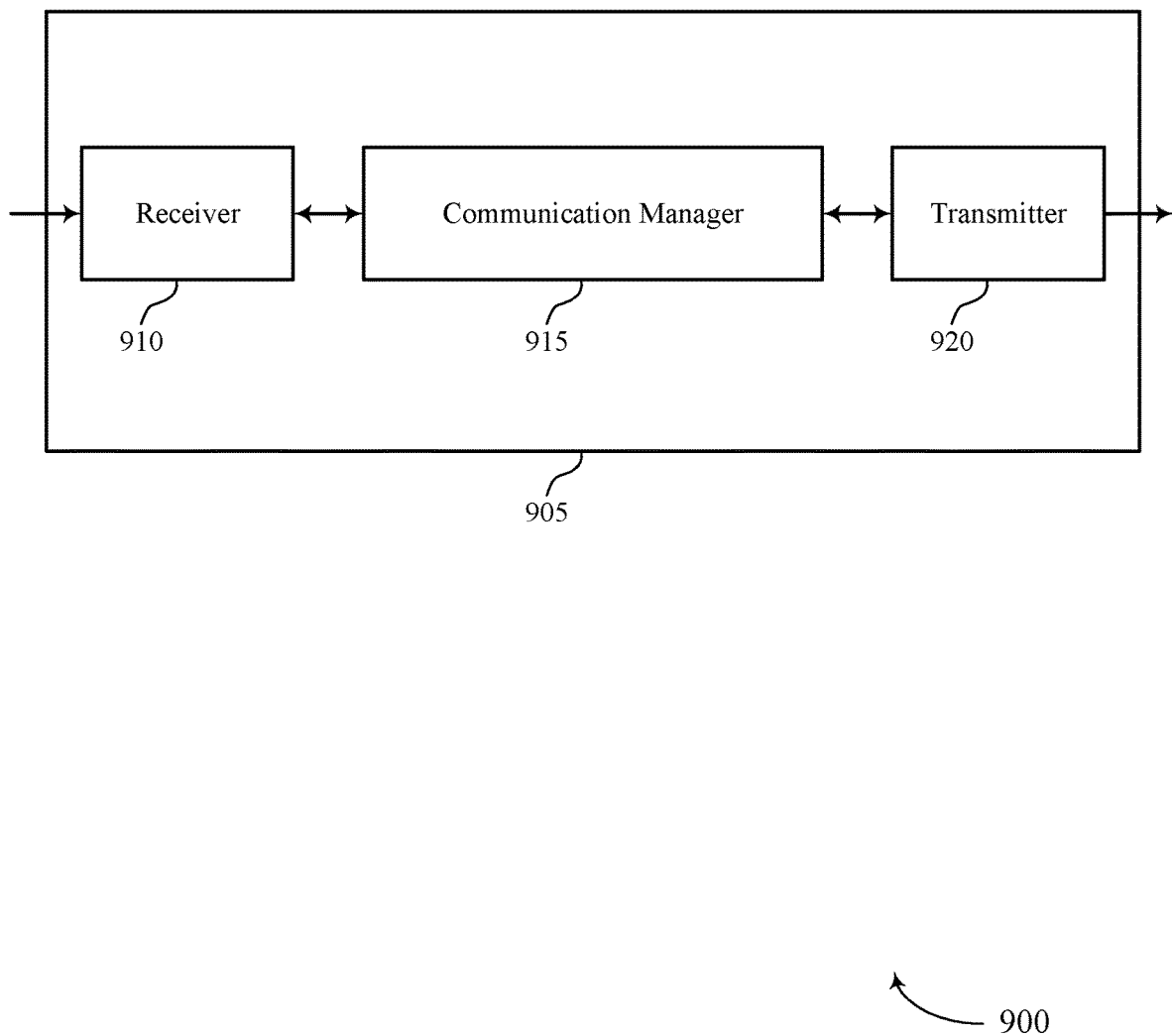
FIGS. 9 and 10 show block diagrams of devices that support time domain behavior and QCL relation for SINR measurement in accordance with aspects of the present disclosure.

FIG. 9 shows a block diagram 900 of a device 905 that supports time domain behavior and QCL relation for SINR measurement in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to time domain behavior and QCL relation for SINR measurement, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may transmit control signaling to configure a UE with a CMR and an IMR within a same time interval and receive, from the UE, a measurement report that indicates a SINR measurement that is generated based on a measurement of the CMR and the IMR. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
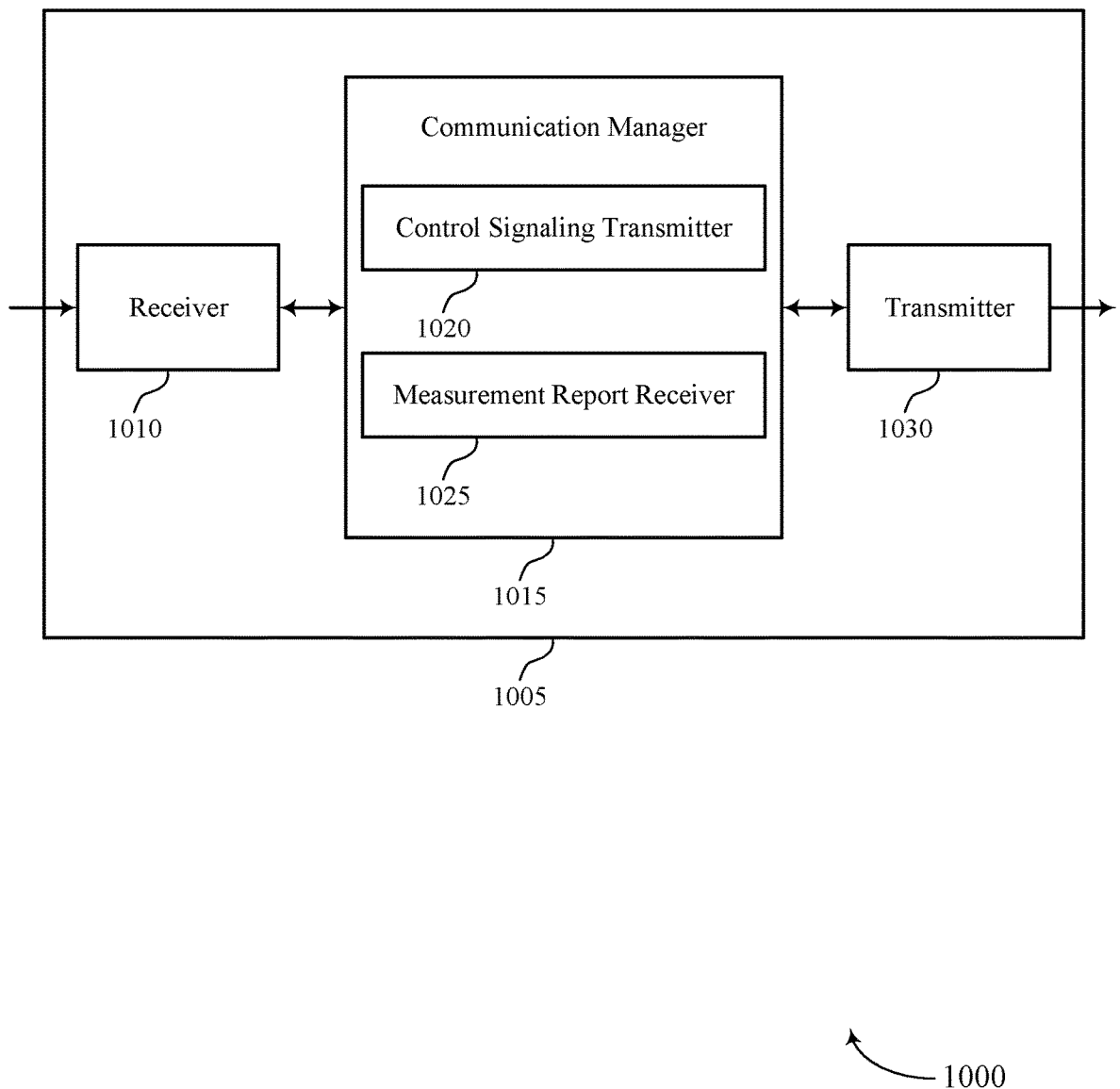

FIG. 10 shows a block diagram 1000 of a device 1005 that supports time domain behavior and QCL relation for SINR measurement in accordance with aspects of the present disclosure. The device 1005 may be an example of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to time domain behavior and QCL relation for SINR measurement, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a control signaling transmitter 1020 and a measurement report receiver 1025. The communication manager 1015 may be an example of aspects of the communication manager 1210 described herein.

The control signaling transmitter 1020 may transmit control signaling to configure a UE with a CMR and an IMR within a same time interval.

The measurement report receiver 1025 may receive, from the UE, a measurement report that indicates a SINR measurement that is generated based on a measurement of the CMR and the IMR.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
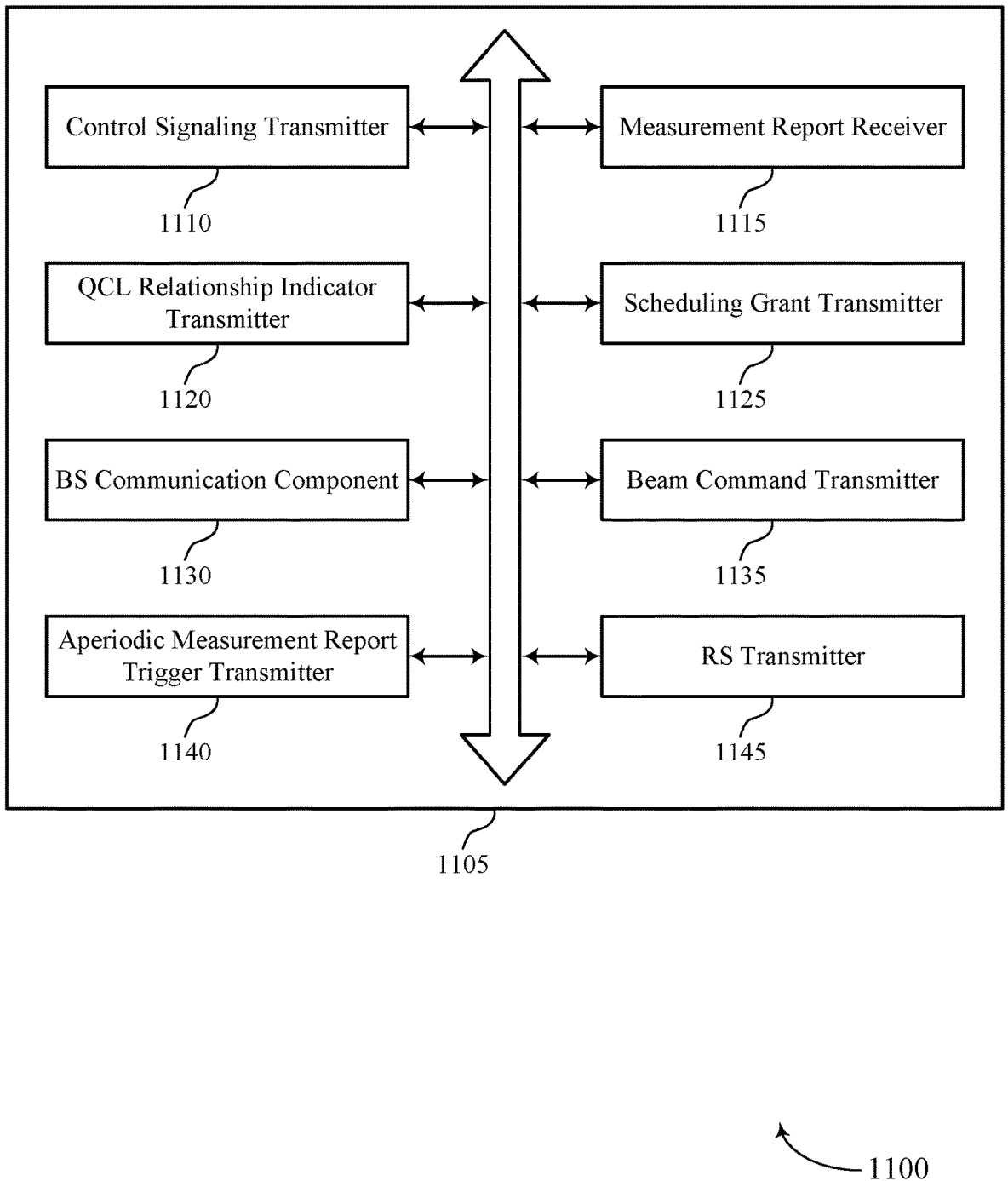
FIG. 11 shows a block diagram of a communication manager that supports time domain behavior and QCL relation for SINR measurement in accordance with aspects of the present disclosure.

FIG. 11 shows a block diagram 1100 of a communication manager 1105 that supports time domain behavior and QCL relation for SINR measurement in accordance with aspects of the present disclosure. The communication manager 1105 may be an example of aspects of a communication manager 915, a communication manager 1015, or a communication manager 1210 described herein. The communication manager 1105 may include a control signaling transmitter 1110, a measurement report receiver 1115, a QCL relationship indicator transmitter 1120, a scheduling grant transmitter 1125, a BS communication component 1130, a beam command transmitter 1135, an aperiodic measurement report trigger transmitter 1140, and a RS transmitter 1145. Each of these modules may communicate, directly or indirectly, with one another (e.g., via one or more buses).

The control signaling transmitter 1110 may transmit control signaling to configure a UE with a CMR and an IMR within a same time interval. In some examples, the control signaling transmitter 1110 may transmit the control signaling that indicates a first periodicity of the CMR and a second periodicity of the IMR, where each instance of the CMR occurs within a respective time interval that includes a respective instance of the IMR based on the first periodicity and the second periodicity. In some examples, the control signaling transmitter 1110 may transmit the control signaling that indicates a first semi-persistent configuration for the CMR and a second semi-persistent configuration for the IMR, where each instance of the CMR occurs within a respective time interval that includes a respective instance of the IMR based on the first semi-persistent configuration and the second semi-persistent configuration.

The measurement report receiver 1115 may receive, from the UE, a measurement report that indicates a SINR measurement that is generated based on a measurement of the CMR and the IMR. In some examples, the measurement report receiver 1115 may periodically receive an updated measurement report that is generated based on a measurement of each instance of the CMR and a corresponding instance of the IMR based on the first periodicity and the second periodicity. In some examples, the measurement report receiver 1115 may receive an updated measurement report that is generated based on a measurement of each instance of the CMR and a corresponding instance of the IMR based on the first semi-persistent configuration and the second semi-persistent configuration.

The QCL relationship indicator transmitter 1120 may transmit a QCL relationship indicator that indicates a QCL relationship for the IMR. In some examples, the QCL relationship indicator transmitter 1120 may transmit a QCL relationship indicator that indicates a QCL relationship for the CMR. In some examples, the QCL relationship indicator transmitter 1120 may transmit a first QCL relationship indicator that indicates a first QCL relationship for the CMR. In some examples, the QCL relationship indicator transmitter 1120 may transmit a second QCL relationship indicator that indicates a second QCL relationship for the IMR.

The scheduling grant transmitter 1125 may transmit a scheduling grant based on the measurement report.

The BS communication component 1130 may communicate a data transmission, a control transmission, or both, with the UE in accordance with the scheduling grant.

The beam command transmitter 1135 may transmit a beam command that indicates a first beam of a set of different beams, where communicating the data transmission, the control transmission, or both, with the UE uses the first beam.

The aperiodic measurement report trigger transmitter 1140 may transmit an aperiodic measurement report trigger indicating a first instance of the CMR and a first instance of the IMR, where the SINR measurement is generated based on measuring the first instance of the CMR and the first instance of the IMR.

The RS transmitter 1145 may transmit a channel state information reference signal within the CMR. In some examples, the RS transmitter 1145 may transmit a zero-power channel state information reference signal or a non-zero-power channel state information reference signal within the IMR. In some examples, the RS transmitter 1145 may transmit a reference signal within the CMR using a beam that has a same QCL relationship for each of the CMR and the IMR. In some examples, the RS transmitter 1145 may transmit a reference signal within the IMR using a beam that has a same QCL relationship for each of the CMR and the IMR.

Figure 12:
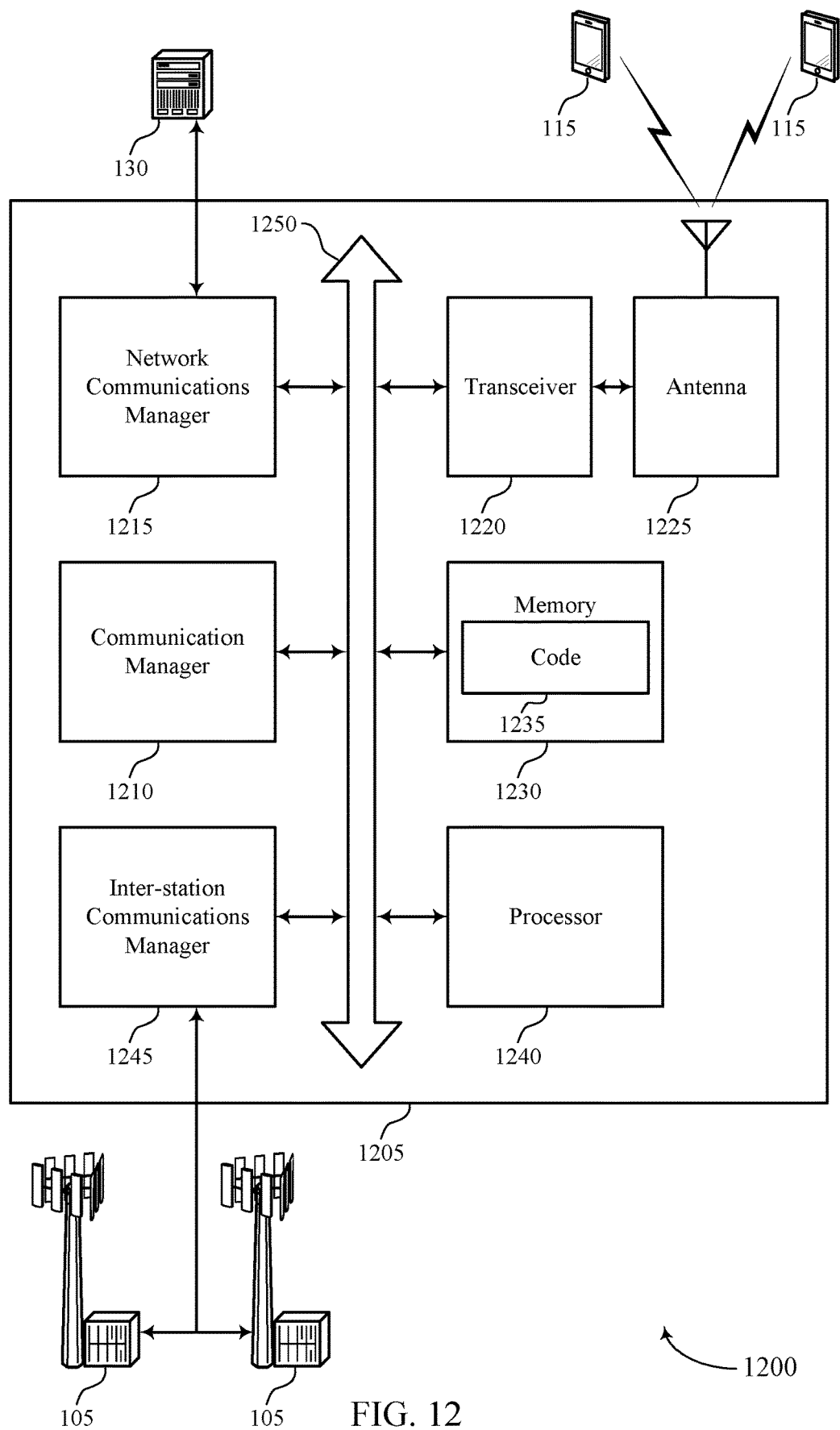
FIG. 12 shows a diagram of a system including a device that supports time domain behavior and QCL relation for SINR measurement in accordance with aspects of the present disclosure.

FIG. 12 shows a diagram of a system 1200 including a device 1205 that supports time domain behavior and QCL relation for SINR measurement in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit control signaling to configure a UE with a CMR and an IMR within a same time interval and receive, from the UE, a measurement report that indicates a SINR measurement that is generated based on a measurement of the CMR and the IMR.

By configuring a UE with a CMR and an IMR within a same time interval, via communication manager 1210, the device 1205 may receive an L1-SINR that provides information on inter-cell and intra-cell interference conditions at a given instance. As such, the device 1205 may better determine whether or not a beam used for L1-SINR measurements is sufficient for performing communications that occur shortly after the L1-SINR is determined as compared to devices that do not prompt a UE to perform L1-SINR measurements in this fashion.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting time domain behavior and QCL relation for SINR measurement).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
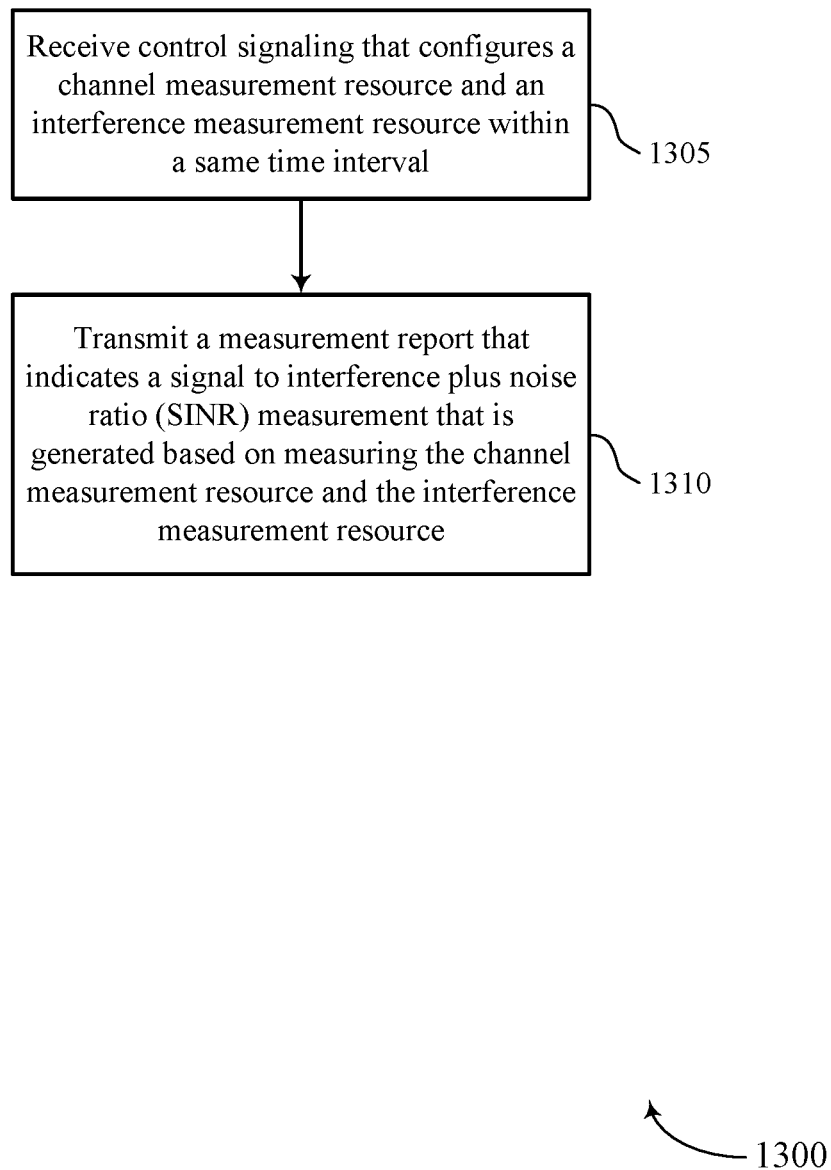
FIGS. 13 through 17 show flowcharts illustrating methods that support time domain behavior and QCL relation for SINR measurement in accordance with aspects of the present disclosure.

FIG. 13 shows a flowchart illustrating a method 1300 that supports time domain behavior and QCL relation for SINR measurement in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may receive control signaling that configures a CMR and an IMR within a same time interval. The operations of 1305 may be performed according to the methods described herein. In some examples, aspects of the operations of 1305 may be performed by a control signaling receiver as described with reference to FIGS. 5 through 8.

At 1310, the UE may transmit a measurement report that indicates a SINR measurement that is generated based on measuring the CMR and the IMR. The operations of 1310 may be performed according to the methods described herein. In some examples, aspects of the operations of 1310 may be performed by a measurement report transmitter as described with reference to FIGS. 5 through 8.

Figure 14:
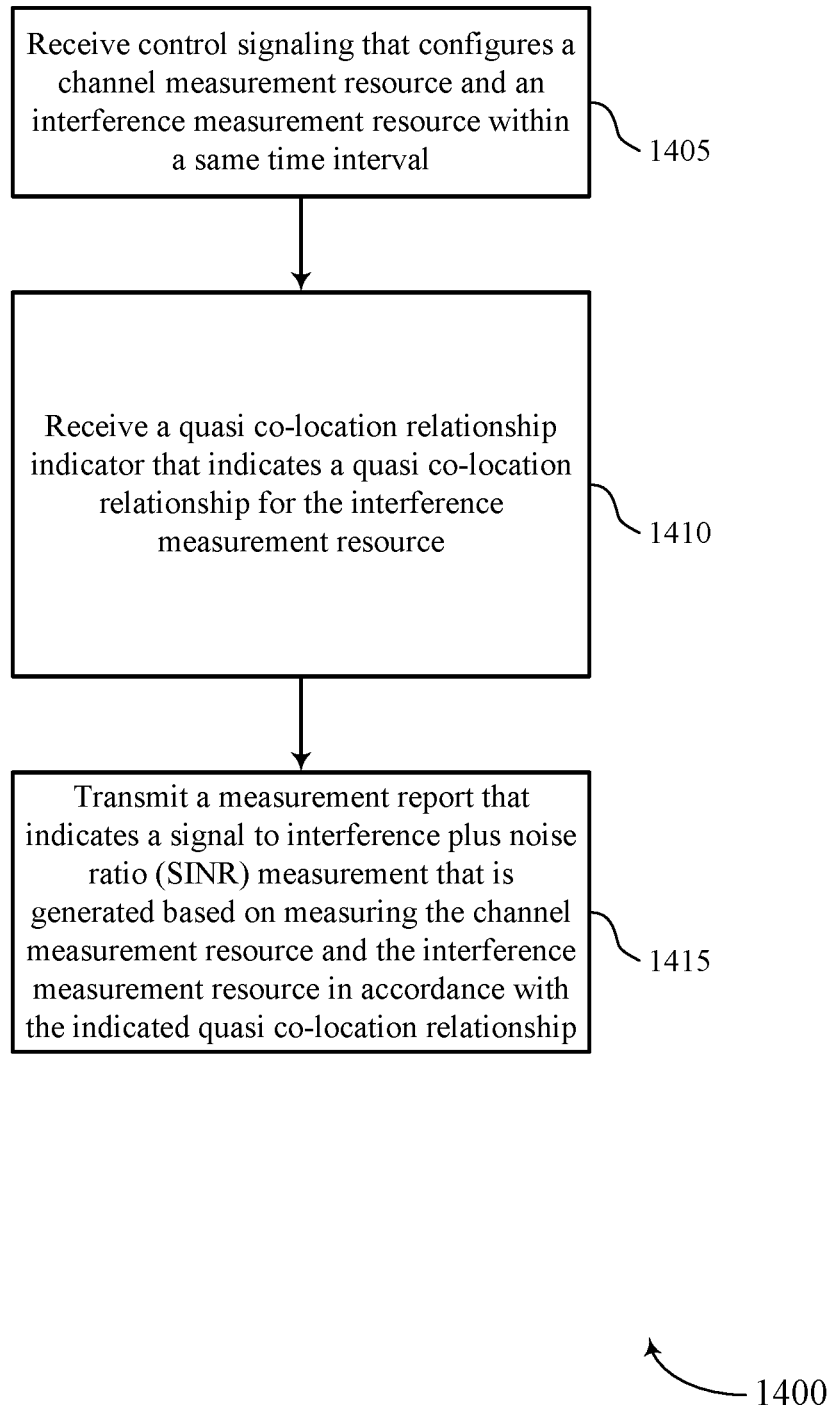

FIG. 14 shows a flowchart illustrating a method 1400 that supports time domain behavior and QCL relation for SINR measurement in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may receive control signaling that configures a CMR and an IMR within a same time interval. The operations of 1405 may be performed according to the methods described herein. In some examples, aspects of the operations of 1405 may be performed by a control signaling receiver as described with reference to FIGS. 5 through 8.

At 1410, the UE may receive a QCL relationship indicator that indicates a QCL relationship for the IMR. The operations of 1410 may be performed according to the methods described herein. In some examples, aspects of the operations of 1410 may be performed by a QCL relationship indicator receiver as described with reference to FIGS. 5 through 8.

At 1415, the UE may transmit a measurement report that indicates a SINR measurement that is generated based on measuring the CMR and the IMR in accordance with the indicated QCL relationship. The operations of 1415 may be performed according to the methods described herein. In some examples, aspects of the operations of 1415 may be performed by a measurement report transmitter as described with reference to FIGS. 5 through 8.

Figure 15:
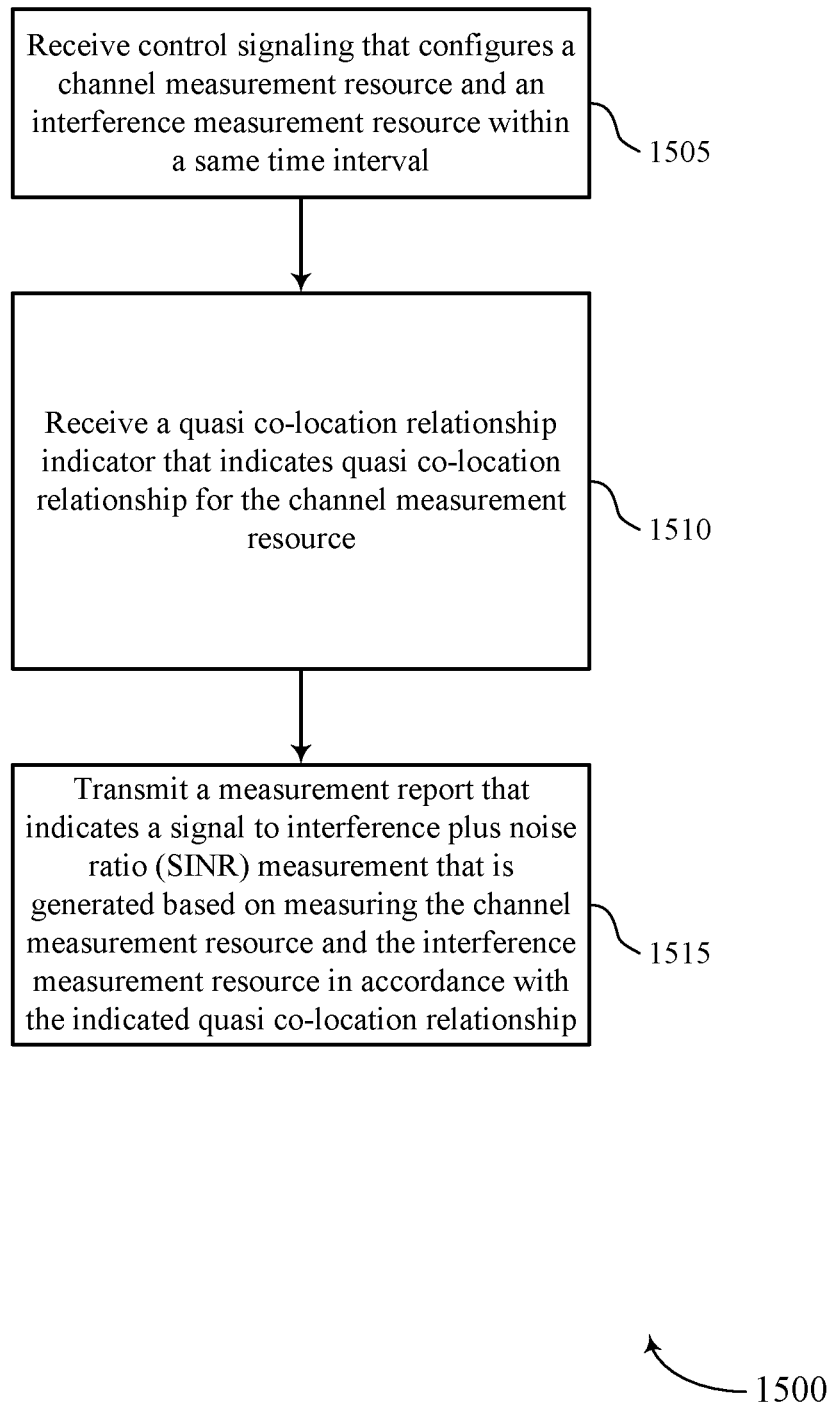

FIG. 15 shows a flowchart illustrating a method 1500 that supports time domain behavior and QCL relation for SINR measurement in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1505, the UE may receive control signaling that configures a CMR and an IMR within a same time interval. The operations of 1505 may be performed according to the methods described herein. In some examples, aspects of the operations of 1505 may be performed by a control signaling receiver as described with reference to FIGS. 5 through 8.

At 1510, the UE may receive a QCL relationship indicator that indicates a QCL relationship for the CMR. The operations of 1510 may be performed according to the methods described herein. In some examples, aspects of the operations of 1510 may be performed by a QCL relationship indicator receiver as described with reference to FIGS. 5 through 8.

At 1515, the UE may transmit a measurement report that indicates a SINR measurement that is generated based on measuring the CMR and the IMR in accordance with the indicated QCL relationship. The operations of 1515 may be performed according to the methods described herein. In some examples, aspects of the operations of 1515 may be performed by a measurement report transmitter as described with reference to FIGS. 5 through 8.

Figure 16:
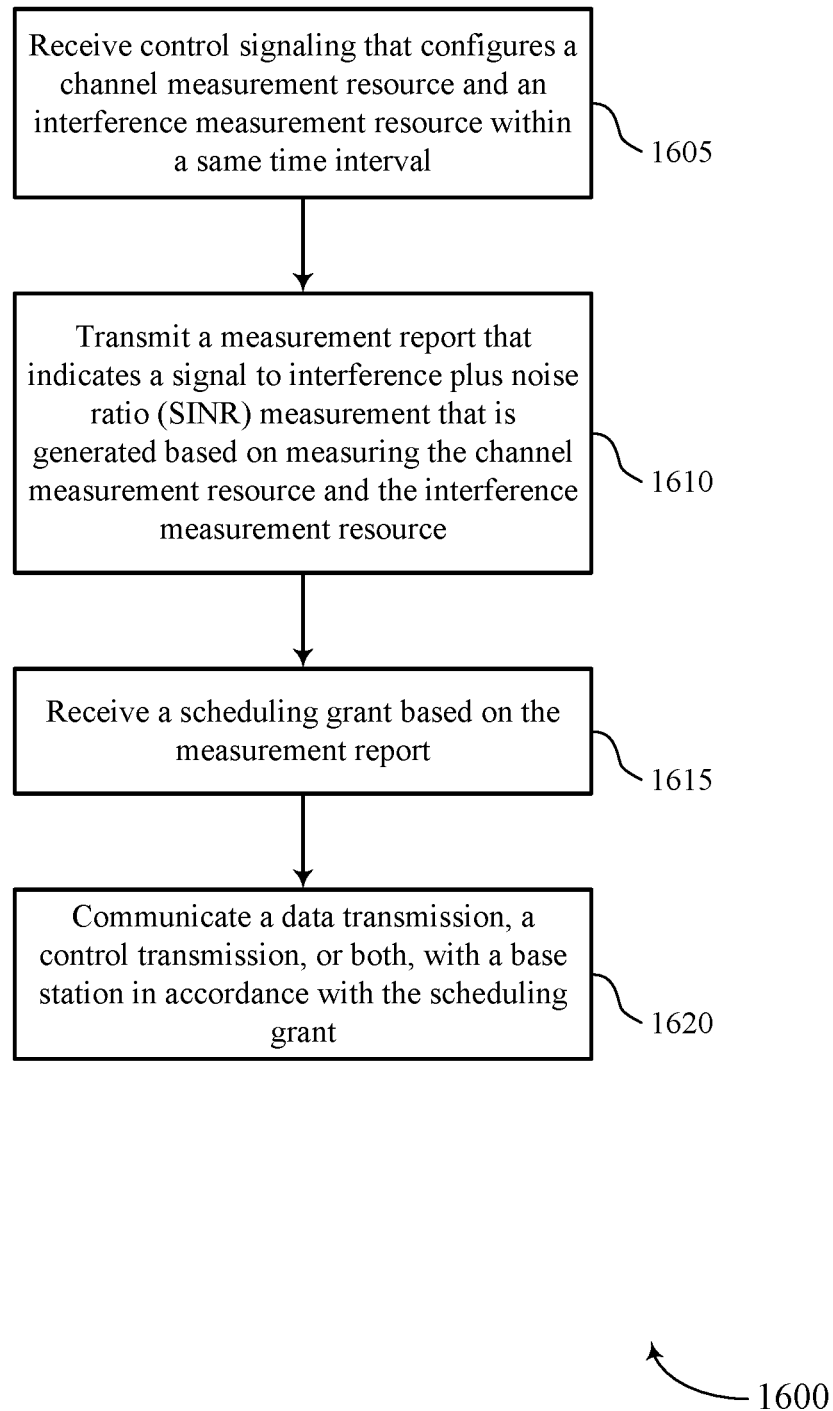

FIG. 16 shows a flowchart illustrating a method 1600 that supports time domain behavior and QCL relation for SINR measurement in accordance with aspects of the present disclosure. The operations of method 1600 may be implemented by a UE 115 or its components as described herein. For example, the operations of method 1600 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1605, the UE may receive control signaling that configures a CMR and an IMR within a same time interval. The operations of 1605 may be performed according to the methods described herein. In some examples, aspects of the operations of 1605 may be performed by a control signaling receiver as described with reference to FIGS. 5 through 8.

At 1610, the UE may transmit a measurement report that indicates a SINR measurement that is generated based on measuring the CMR and the IMR. The operations of 1610 may be performed according to the methods described herein. In some examples, aspects of the operations of 1610 may be performed by a measurement report transmitter as described with reference to FIGS. 5 through 8.

At 1615, the UE may receive a scheduling grant based on the measurement report. The operations of 1615 may be performed according to the methods described herein. In some examples, aspects of the operations of 1615 may be performed by a scheduling grant receiver as described with reference to FIGS. 5 through 8.

At 1620, the UE may communicate a data transmission, a control transmission, or both, with a base station in accordance with the scheduling grant. The operations of 1620 may be performed according to the methods described herein. In some examples, aspects of the operations of 1620 may be performed by an UE communication component as described with reference to FIGS. 5 through 8.

Figure 17:
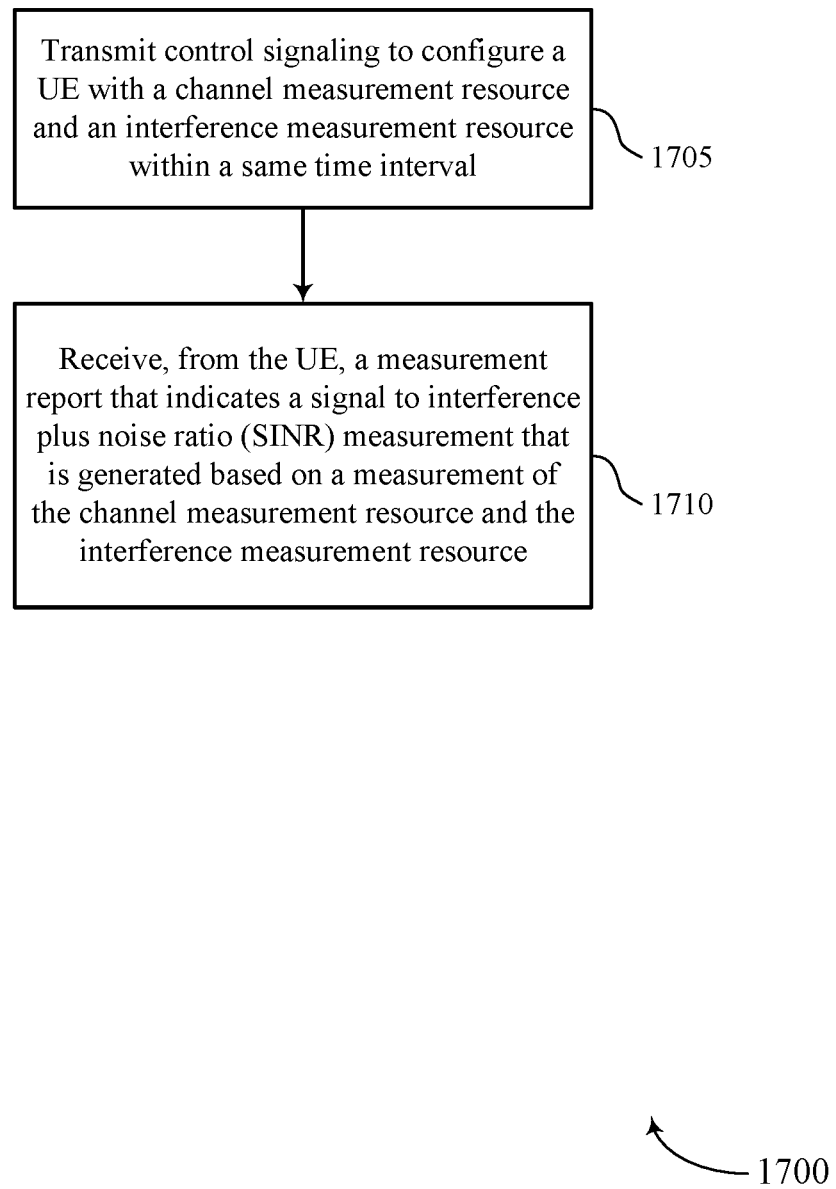

FIG. 17 shows a flowchart illustrating a method 1700 that supports time domain behavior and QCL relation for SINR measurement in accordance with aspects of the present disclosure. The operations of method 1700 may be implemented by a base station 105 or its components as described herein. For example, the operations of method 1700 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1705, the base station may transmit control signaling to configure a UE with a CMR and an IMR within a same time interval. The operations of 1705 may be performed according to the methods described herein. In some examples, aspects of the operations of 1705 may be performed by a control signaling transmitter as described with reference to FIGS. 9 through 12.

At 1710, the base station may receive, from the UE, a measurement report that indicates a SINR measurement that is generated based on a measurement of the CMR and the IMR. The operations of 1710 may be performed according to the methods described herein. In some examples, aspects of the operations of 1710 may be performed by a measurement report receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving first control signaling that configures a first quasi co-location relationship for a channel measurement resource;
   receiving second control signaling that configures a second quasi co-location relationship for an interference measurement resource that differs from the first quasi co-location relationship;
   measuring, within a same time interval, the channel measurement resource using the first quasi co-location relationship and the interference measurement resource using the first quasi co-location relationship based at least in part on the second quasi co-location relationship differing from the first quasi co-location relationship; and
   transmitting a measurement report that indicates a signal to interference plus noise ratio (SINR) measurement that is generated based at least in part on the measuring.

2. The method of claim 1, wherein receiving the first control signaling comprises:
   receiving the first control signaling that indicates to override the second quasi co-location relationship configured for the interference measurement resource.

3. The method of claim 1, further comprising:
   measuring a non-zero-power channel state information reference signal within the interference measurement resource.

4. The method of claim 1, further comprising:
   measuring the channel measurement resource and the interference measurement resource over a same beam.

5. The method of claim 1, further comprising:
   receiving a scheduling grant based at least in part on the measurement report; and
   communicating a data transmission, a control transmission, or both, with a base station in accordance with the scheduling grant.

6. The method of claim 5, further comprising:
   receiving a beam command that indicates a first beam of a plurality of different beams, wherein communicating the data transmission, the control transmission, or both, with the base station uses the first beam.

7. The method of claim 1, wherein
   the first control signaling indicates a first periodicity of the channel measurement resource and the second control signaling indicates a second periodicity of the interference measurement resource, wherein each instance of the channel measurement resource occurs within a respective time interval that includes a respective instance of the interference measurement resource based at least in part on the first periodicity and the second periodicity.

8. The method of claim 7, further comprising:
   receiving an aperiodic measurement report trigger indicating a first instance of the channel measurement resource and a first instance of the interference measurement resource, wherein the SINK measurement is generated based at least in part on measuring the first instance of the channel measurement resource and the first instance of the interference measurement resource.

9. The method of claim 7, further comprising:
   periodically transmitting an updated measurement report that is generated based at least in part on measuring each instance of the channel measurement resource and a corresponding instance of the interference measurement resource based at least in part on the first periodicity and the second periodicity.

10. The method of claim 1, wherein
    the first control signaling indicates a first semi-persistent configuration for the channel measurement resource and the second control signaling a second semi-persistent configuration for the interference measurement resource, wherein each instance of the channel measurement resource occurs within a respective time interval that includes a respective instance of the interference measurement resource based at least in part on the first semi-persistent configuration and the second semi-persistent configuration.

11. The method of claim 10, further comprising:
    transmitting an updated measurement report that is generated based at least in part on measuring each instance of the channel measurement resource and a corresponding instance of the interference measurement resource based at least in part on the first semi-persistent configuration and the second semi-persistent configuration.

12. The method of claim 1, further comprising:
    measuring a channel state information reference signal within the channel measurement resource.

13. The method of claim 1, further comprising:
    measuring a zero-power channel state information reference signal within the interference measurement resource.

14. The method of claim 1, wherein measuring the channel measurement resource and the interference measurement resource comprises:
    measuring the channel measurement resource and the interference measurement resource based at least in part on using a beam that has the first quasi co-location relationship for each of the channel measurement resource and the interference measurement resource.

15. The method of claim 1, wherein the measurement report is a layer 1 SINR (L1-SINR) report.

16. A method for wireless communications by a base station, comprising:
    transmitting first control signaling to configure a user equipment (UE) with a first quasi co-location relationship for a channel measurement resource;
    transmitting second control signaling that configures the UE with a second quasi co-location relationship for an interference measurement resource that differs from the first quasi co-location relationship; and receiving, from the UE, a measurement report that indicates a signal to interference plus noise ratio (SINR) measurement that is generated based at least in part on a measurement, within a same time interval, of the channel measurement resource using the first quasi co-location relationship and the interference measurement resource using the first quasi co-location relationship.

17. The method of claim 16, further comprising:
transmitting the first control signaling that indicates to override the second quasi co-location relationship configured for the interference measurement resource.

18. The method of claim 16, further comprising:
transmitting a non-zero-power channel state information reference signal within the interference measurement resource.

19. The method of claim 16, further comprising:
transmitting a reference signal within the interference measurement resource using a beam that has the first quasi co-location relationship for each of the channel measurement resource and the interference measurement resource.

20. The method of claim 16, further comprising:
transmitting a scheduling grant based at least in part on the measurement report; and
communicating a data transmission, a control transmission, or both, with the UE in accordance with the scheduling grant.

21. The method of claim 16, wherein
the first control signaling indicates a first periodicity of the channel measurement resource and the second control signaling indicates a second periodicity of the interference measurement resource, wherein each instance of the channel measurement resource occurs within a respective time interval that includes a respective instance of the interference measurement resource based at least in part on the first periodicity and the second periodicity.

22. The method of claim 16, wherein
the first control signaling indicates a first semi-persistent configuration for the channel measurement resource and the second control signaling indicates a second semi-persistent configuration for the interference measurement resource, wherein each instance of the channel measurement resource occurs within a respective time interval that includes a respective instance of the interference measurement resource based at least in part on the first semi-persistent configuration and the second semi-persistent configuration.

23. The method of claim 16, further comprising:
transmitting a reference signal within the channel measurement resource using a beam that has the first quasi co-location relationship for each of the channel measurement resource and the interference measurement resource.

24. The method of claim 16, wherein the measurement report is a layer 1 SINR (L1-SINR) report.

25. An apparatus for wireless communications by a user equipment (UE), comprising:
a processor,
memory in electronic communication with the processor, and
instructions stored in the memory and executable by the processor to cause the apparatus to:
receive first control signaling that configures a first quasi co-location relationship for a channel measurement resource;
receive second control signaling that configures a second quasi co-location relationship for an interference measurement resource that differs from the first quasi co-location relationship;
measure, within a same time interval, the channel measurement resource using the first quasi co-location relationship and the interference measurement resource using the first quasi co-location relationship based at least in part on the second quasi co-location relationship differing from the first quasi co-location relationship; and
transmit a measurement report that indicates a signal to interference plus noise ratio (SINR) measurement that is generated based at least in part on measuring, within a same time interval, the channel measurement resource using the first quasi co-location relationship and the interference measurement resource using the first quasi co-location relationship.

26. An apparatus for wireless communications by a base station, comprising:
a processor,
memory in electronic communication with the processor, and
instructions stored in the memory and executable by the processor to cause the apparatus to:
transmit first control signaling to configure a user equipment (UE) with a first quasi co-location relationship for a channel measurement resource;
transmit second control signaling that configures the UE with a second quasi co-location relationship for an interference measurement resource that differs from the first quasi co-location relationship and
receive, from the UE, a measurement report that indicates a signal to interference plus noise ratio (SINR) measurement that is generated based at least in part on a measurement, within a same time interval, of the channel measurement resource using the first quasi co-location relationship and the interference measurement resource using the first quasi co-location relationship.

* * * * *